United States Patent
Mesguen et al.

(10) Patent No.: US 9,457,892 B2
(45) Date of Patent: Oct. 4, 2016

(54) MANAGEMENT INTERFACES FOR AIRCRAFT SYSTEMS

(71) Applicant: Airbus Operations (S.A.S.), Toulouse (FR)

(72) Inventors: Mael Mesguen, Cernay la Ville (FR); François Buron, Le Pecq (FR); Thibaut Poux, Toulouse (FR)

(73) Assignee: AIRBUS OPERATIONS (S.A.S.), Toulouse (FR)

( * ) Notice: Subject to any disclaimer, the term of this patent is extended or adjusted under 35 U.S.C. 154(b) by 0 days.

(21) Appl. No.: 14/171,411

(22) Filed: Feb. 3, 2014

(65) Prior Publication Data

US 2015/0217856 A1 Aug. 6, 2015

(51) Int. Cl.
*B64C 19/00* (2006.01)
*B64D 43/00* (2006.01)
*B64D 45/00* (2006.01)

(52) U.S. Cl.
CPC ............... *B64C 19/00* (2013.01); *B64D 43/00* (2013.01); *B64D 2045/0085* (2013.01)

(58) Field of Classification Search
CPC .............................. G01C 23/00; B64C 19/00
USPC ............................................................ 701/3
See application file for complete search history.

(56) References Cited

U.S. PATENT DOCUMENTS

| | | | |
|---|---|---|---|
| 4,819,183 A | 4/1989 | O'Brien et al. | |
| 5,152,146 A | 10/1992 | Butler | |
| 5,241,814 A | 9/1993 | Butler | |
| 5,499,784 A | 3/1996 | Crabere et al. | |
| 5,904,729 A | 5/1999 | Ruzicka | |
| 6,633,801 B1 | 10/2003 | Durlacher et al. | |
| 6,636,786 B2 * | 10/2003 | Partel ................................ | 701/3 |
| 6,946,976 B1 | 9/2005 | Langner | |
| 7,142,131 B2 | 11/2006 | Sikora | |
| 7,148,814 B2 | 12/2006 | Sikora et al. | |
| 7,260,453 B2 | 8/2007 | Poier et al. | |
| 7,295,135 B2 | 11/2007 | Younkin | |
| 7,309,048 B2 | 12/2007 | von Thal | |

(Continued)

FOREIGN PATENT DOCUMENTS

FR 2 985 069 A1 6/2013
WO WO 2006/066702 A1 6/2006

OTHER PUBLICATIONS

U.S. Appl. No. 14/171,425, filed Feb. 3, 2014.

(Continued)

*Primary Examiner* — Behrang Badii
*Assistant Examiner* — Michael Berns
(74) *Attorney, Agent, or Firm* — Jenkins, Wilson, Taylor & Hunt, P.A.

(57) ABSTRACT

Methods, systems, and computer readable media are disclosed for managing an aircraft's systems through a dedicated interface. One aspect of a method for implementing the subject matter described herein includes at least one global visualization interface for managing aircraft systems and including a hardware processor. The method also includes displaying at least one or more graphic object representing at least one or more aircraft system, displaying at least one or more energy flow icon representing the direction of circulation of an energy flow, and accessing a system management interface of at least one or more aircraft system through performing an user interaction with the graphic object.

19 Claims, 20 Drawing Sheets

(56) References Cited

U.S. PATENT DOCUMENTS

| | | | |
|---|---|---|---|
| 7,321,318 | B2 | 1/2008 | Crane |
| D590,409 | S | 4/2009 | Shibata |
| D600,702 | S | 9/2009 | Osborne |
| 7,772,995 | B2 * | 8/2010 | Cabaret De Alberti et al. ............................ 340/980 |
| 7,868,785 | B1 | 1/2011 | Wang |
| 7,873,446 | B2 | 1/2011 | Shehi |
| 7,880,597 | B2 | 2/2011 | Uchida |
| 8,188,972 | B1 * | 5/2012 | Krenz et al. .................. 345/157 |
| 8,359,542 | B2 | 1/2013 | Dingeman |
| 8,378,853 | B2 | 2/2013 | Smith et al. |
| 8,421,649 | B2 | 4/2013 | Marstall |
| D682,314 | S | 5/2013 | Lau |
| 8,630,752 | B2 | 1/2014 | Gurusamy |
| 8,633,913 | B1 | 1/2014 | Raghu et al. |
| 8,788,138 | B1 | 7/2014 | Yogesha et al. |
| D717,819 | S | 11/2014 | Lee |
| D722,081 | S | 2/2015 | Gerber |
| D726,758 | S | 4/2015 | Bourret |
| 9,058,742 | B2 | 6/2015 | Conrardy et al. |
| 9,205,929 | B2 * | 12/2015 | Conner ................. B64D 45/00 |
| 2002/0120375 | A1 | 8/2002 | Draoullec et al. |
| 2003/0078704 | A1 | 4/2003 | Partel |
| 2003/0156137 | A1 * | 8/2003 | Von Essen et al. .......... 345/771 |
| 2004/0073571 | A1 | 4/2004 | Kumhyr et al. |
| 2005/0004723 | A1 | 1/2005 | Duggan et al. |
| 2009/0002764 | A1 * | 1/2009 | Atkins et al. ................ 358/1.18 |
| 2011/0040470 | A1 | 2/2011 | Qiu et al. |
| 2011/0296340 | A1 | 12/2011 | Nakagawa |
| 2012/0072098 | A1 | 3/2012 | Righi et al. |
| 2012/0209468 | A1 | 8/2012 | Thomas |
| 2015/0217857 | A1 | 8/2015 | Mesguen et al. |
| 2015/0217874 | A1 | 8/2015 | Mesguen et al. |

OTHER PUBLICATIONS

U.S. Appl. No. 29/841,235, filed Feb. 3, 2014.
U.S. Appl. No. 29/481,238, filed Feb. 3, 2014.
U.S. Appl. No. 29/481,240, filed Feb. 3, 2014.
U.S. Appl. No. 29/481,251, filed Feb. 3, 2014.
Non-Final Office Action for U.S. Appl. No. 14/171,425 dated May 4, 2015.
PMDG 747-400 Aircraft Operating Manual Revision 1.0, Aircraft Operating Manual & Flight Management Computer Handbook, Revisions Jun. 10, 2005 and Jul. 26, 2005, Precision Manuals Development Group, PMDG 747-400—AOM, pp. Cover, 0-2, 7-28 thru 7-30, 11-7 thru 11-9, 11-12 thru 11-19, 11-44 thru 11-55, and 11-65 thru 11-67.
Non-Final Office Action for U.S. Appl. No. 14/171,444 dated May 22, 2015.
Norris G., "Flying smart the spread of technology such as laptop computers is pushing cockpit advances", Flight International, Reed Business Information, Sutton Surrey, GB, vol. 157, No. 4718, Mar. 7, 2000, p. 34/35.
Extended European Search Report for Application No. EP 15 15 3441 dated Jun. 29, 2015.
Final Office Action for U.S. Appl. No. 14/171,425 dated Aug. 24, 2015.
Learmount D: "Cognitive Cockpit End of Human Pilot Could Be in Sight", Flight International, Reed Business Information, Sutton Surrey, GB, vol. 158, No. 4748, Sep. 26, 2000, p. 43/44, 46, XP000959525, ISSN: 0015-3710 figure on p. 46, caption, and associated descriptive text.
Extended European Search Report for Application No. EP 15 15 3439 dated Jun. 30, 2015.
Notice of Allowance for U.S. Appl. No. 14/171,444 dated Oct. 13, 2015.
Non-Final Office Action for U.S. Appl. No. 29/841,235 dated Oct. 19, 2015.
Non-Final Office Action for U.S. Appl. No. 29/481,238 dated Oct. 19, 2015.
Non-Final Office Action for U.S. Appl. No. 29/481,240 dated Oct. 19, 2015.
Non-Final Office Action for U.S. Appl. No. 29/481,251 dated Oct. 19, 2015.
Applicant Initiated Interview Summary for U.S. Appl. No. 14/171,425 dated Dec. 14, 2015.
Non-Final Office Action for U.S. Appl. No. 14/171,425 dated Jan. 7, 2016.
Final Office Action for U.S. Appl. No. 29/841,235 dated Feb. 26, 2016.
Notice of Allowance for U.S. Appl. No. 14/171,444 dated Mar. 1, 2016.
Notice of Allowance for U.S. Appl. No. 14/171,425 dated Apr. 22, 2016.
Notice of Allowance for U.S. Appl. No. 29/481,238 dated Apr. 25, 2016.
Notice of Allowance for U.S. Appl. No. 29/481,240 dated Apr. 25, 2016.
Notice of Allowance for U.S. Appl. No. 29/481,251 dated May 2, 2016.
Notice of Allowance for U.S. Appl. No. 29,481,235 dated May 13, 2016.

* cited by examiner

|  | OPERATIONAL | DEGRADED | SYSTEM GUIDAGE OPERATIONAL | DEGRADED |
|---|---|---|---|---|
| ACTIVE (ON) INTERACTIVE | CENTER | CENTER | CENTER | CENTER |
| INACTIVE (OFF) INTERACTIVE | CENTER | CENTER | CENTER | CENTER |
| ACTIVE (ON) LOCKED | CENTER | CENTER | CENTER | CENTER |
| INACTIVE (OFF) LOCKED | CENTER | CENTER | CENTER | CENTER |

FIG. 6N

MANAGEMENT INTERFACES FOR AIRCRAFT SYSTEMS

TECHNICAL FIELD

The subject matter described herein relates generally to aircraft systems management. More particularly, the subject matter disclosed herein relates to methods, systems and computer readable media for a centralized integrated view for the management of aircraft systems, during both normal and abnormal situations of an aircraft's operation.

BACKGROUND

The management of a plurality of aircraft systems in current configurations, including fuel, electric, engines, and orders of flight is performed using three devices. First, a screen displays some information about these systems, gathering various parameters measured by sensors, as well as the state of the equipment composing each system of the plane. Secondly, an order-system overhead panel equipped with a plurality of buttons, chokes, and switches that act on the various systems allows an aircraft operator to control these various systems, with an increased level of confusion associated with the significant number of such control buttons, chokes, and switches available on the panel. Thirdly, a screen displays any breakdowns detected by the systems as well as the procedure to limit the impact of these breakdowns on the safety of the flight and the other flight operations.

There is a need to simplify these systems and reduce the possibility for errors made by the operator when responding to situations that arise during flight operations.

SUMMARY

According to one aspect, the subject matter described herein comprises a method for managing an aircraft's systems through a dedicated interface. The method includes, at at least one global visualization interface for managing aircraft systems and comprising a hardware processor, displaying at least one or more graphic object representing at least one or more aircraft system, displaying at least one or more energy flow icon representing the direction of circulation of an energy flow, and accessing a system management interface, that can be a local system management interface for local control on an aircraft, of the at least one or more aircraft system through performing a user interaction with the graphic object.

According to another aspect, the subject matter described herein comprises a system for managing an aircraft's systems. The system includes a dedicated global visualization interface for managing aircraft systems and comprising a hardware processor. The interface comprises at least one or more graphic object representing at least one or more functions realized by the considered system, and at least one or more energy flow icon representing the direction of circulation of an energy flow.

According to yet another aspect, the subject matter described herein comprises a non-transitory computer readable medium having stored thereon executable instructions that when executed by the processor of a computer control the computer performs, at a global visualization interface for managing aircraft systems and comprising a hardware processor, displaying at least one or more graphic object representing at least one or more aircraft system, displaying at least one or more energy flow icon representing the direction of circulation of an energy flow, and accessing a system management interface of the at least one or more aircraft system through performing a user interaction with the graphic object.

The subject matter described herein can be implemented in software in combination with hardware and/or firmware. For example, the subject matter described herein may be implemented in software executed by one or more processors. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein can include non-transitory computer readable media such as, for example and without limitation, disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings, of which:

FIG. 6N is an exemplary illustration of a collection of graphic objects usable by a management interface in accordance with aspects of the subject matter described herein.

DETAILED DESCRIPTION

In accordance with the description herein and exemplary, associated drawings, novel methods, systems, and computer readable media are disclosed for simulating user interactions with a simulated aircraft cockpit. Such methods, systems and computer readable media are particularly suitable for use, for example and without limitation, for 3D modeling of a cockpit associated with an emulation of aircraft systems.

Notably, the subject matter described herein provides an integrated interface system for the simplification of the management of systems of an aircraft for use during either a prescribed situation or a non-prescribed situation that may occur during flight operations. A prescribed flight situation includes flight operations situations when the aircraft operating systems indicate or emit a diagnosis of breakdown, or when an operator detects a breakdown not detected by the aircraft operating systems. In this case, a known procedure is applied in response to the detected breakdown. Prescribed flight situations occur when the aircraft operating systems require an operator to configure a setting in a particular configuration in response to the detected breakdown, or for the operator to pay attention to a particular aircraft operating system or operating parameter. A prescribed flight situation could include, for example, the detection of an unknown source of smoke, detected by either the operator or operating systems onboard the aircraft.

A non-prescribed flight situation occurs when the aircraft operating systems indicate that the aircraft operating systems do not detect any abnormal situation or condition, whereas the aircraft is in a situation recognized by the operator as dangerous or abnormal for the given flight conditions. In this non-prescribed flight situation, a coherent action plan cannot be formulated by the aircraft operating systems, or no procedure exists for the current flight situation for the operator to follow in order to resolve the abnormality in the flight conditions. Non-prescribed flight situations occur, for example, when the operator wishes to put the plane in a particular configuration or to visualize particular parameters not required by a procedure outlined by standard flight operating procedures. A non-prescribed flight situation could include the investigation of managing remaining fuel onboard the aircraft by the operator.

Figure 1A:
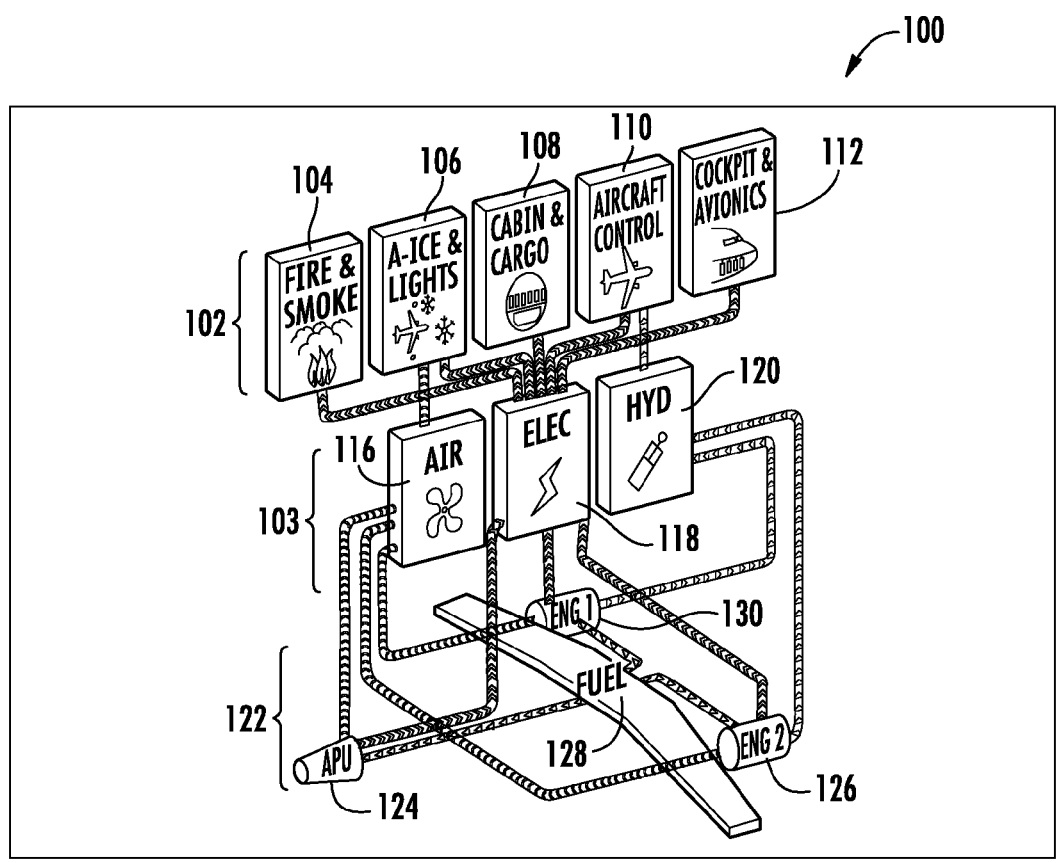
FIG. 1A is an exemplary embodiment of a global visualization interface for providing aircraft operators with a comprehensive view of the state of the aircraft systems and their relations in accordance with aspects of the subject matter described herein.

In some aspects, an aircraft's various systems are managed through an unique device with dedicated interfaces. FIG. 1A is an exemplary embodiment of a global visualization interface, generally designated 100, for providing aircraft operators with a comprehensive view of the state of the aircraft systems and their relations, in accordance with aspects of the subject matter described herein. In some aspects, the global visualization interface 100 has three levels connected by energy flow diagrams. The first level systems are Energy Consumer systems 102 such as Aircraft FIRE & SMOKE 104 systems, A-ICE & LIGHTS 106 systems, CABIN & CARGO 108 systems, AIRCRAFT CONTROL 110 systems and COCKPIT & AVIONICS 112 systems. The second level systems are Energy Distributor 103 systems such as Air 116, ELEC 118, and HYD 120. The third level systems are Energy Supplier 122 systems such as auxiliary power unit (APU) 124, engine 1 (ENG 1) 130 and engine 2 (ENG 2) 126, and FUEL 128 systems. Each system is represented with a graphical object such as a volume in axonometric perspective, associated with a textual label and graphic symbol describing the associated aircraft system.

In some aspects, an aircraft operator interacts with an aircraft system by using, for example, tactile features such as a touchscreen display, or interactive devices such as a computer mouse or track-wheel selector. When selected, each of the graphic objects gives access to a local view of a management system about the associated aircraft system.

Figure 1B:
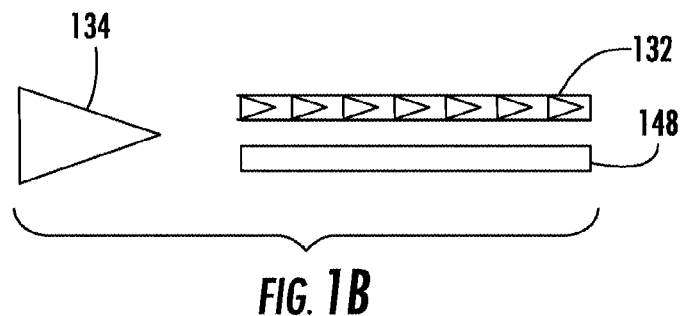
FIGS. 1B to 1E are exemplary embodiments of energy flow icons in accordance with aspects of the subject matter described herein.
Figure 1C:
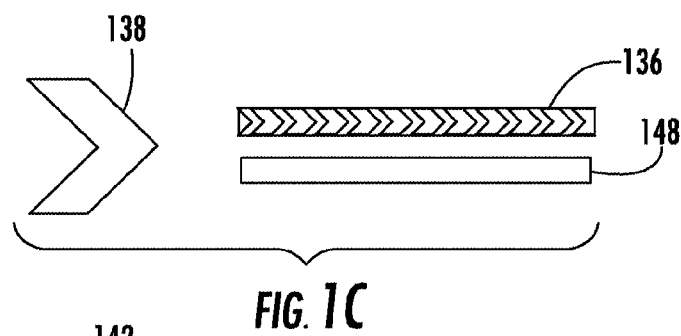
Figure 1D:
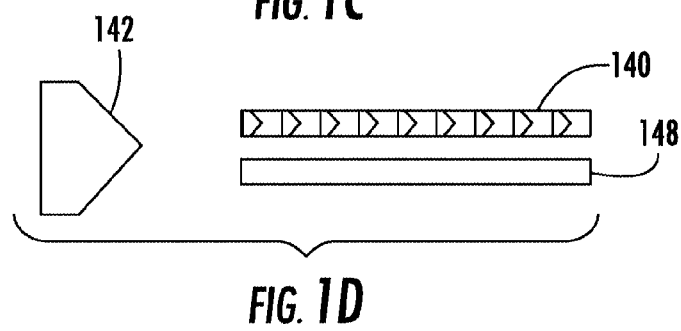
Figure 1E:
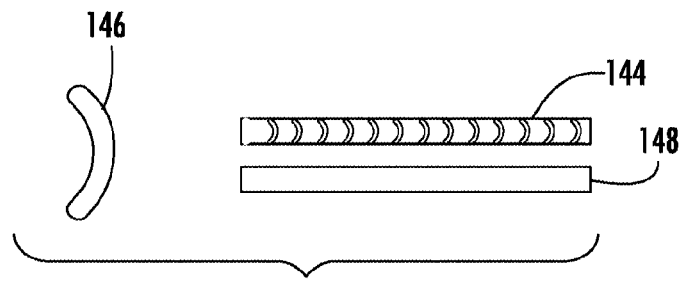

In some aspects, the aircraft systems as displayed on the global visualization interface 100 are connected to other systems by various graphical icons representing energy flows. For example, FIG. 1B depicts an exemplary illustration of a graphical icon 132 representing the flow of aircraft fuel. As illustrated in FIG. 1B, fuel flow icon 132 has long arrows 134 representing the direction of displacement of the fuel, which accentuates the effect of fluid movement when compared to the flows of ELEC (electrical) or HYD (hydraulic) systems for which there is little or no physical displacement. Referring back to FIG. 1A, the FUEL 128 supplier system is configured to direct aircraft fuel to systems such as ENG1 126, ENG2 128, and APU 124. Similarly, FIG. 1C depicts an exemplary illustration of a graphical icon 136 representing the flow of electric flux. As illustrated in FIG. 1C, electric flux icon 136 includes marks with arrow shaped symbols 138. Referring back to FIG. 1A, the aircraft engines (ENG 1 130 and ENG 2 126) and the APU 124 are configured to direct electric flux first to the ELEC 118 distributor system, and the ELEC 118 system then distributes the electric flux to energy consumer systems such as FIRE & SMOKE 104 systems, A-ICE & LIGHTS 106 systems, CABIN & CARGO 108 systems, AIRCRAFT CONTROL 110 systems and COCKPIT & AVIONICS 112 systems. Furthermore, FIG. 1D depicts an exemplary illustration of a graphical icon 140 representing hydraulic flow of the aircraft. As illustrated in FIG. 1D, hydraulic flow 140 includes marks with arrows at base punt pointing out the hydraulic pistons. Referring back to FIG. 1A, the aircraft engines (ENG 1 130 and ENG 2 126) are configured to direct hydraulic flux first to the HYD 120 distributor system, and the HYD 120 system then distributes the hydraulic flux to energy consumer systems such as the AIRCRAFT CONTROL 110 system. In addition, FIG. 1E depicts an exemplary illustration of a graphical icon 144 representing air flow of the aircraft. As illustrated in FIG. 1E, air flow 144 includes arcs symbolizing a wave of air volume displacement. Referring back to FIG. 1A, the aircraft engines (ENG 1 130 and ENG 2 126) and the APU 124 are configured to direct air flow first to the AIR 116 distributor system, and the AIR 116 system then distributes the air flow to energy consumer systems such as the A-ICE & LIGHTS 106 system. It should be noted that other symbols or icons can be easily utilized to represent various types of flows, as the examples provided herein are intended to explain the subject matter and not as a limitation. Furthermore, interruptions or breakdown of energy flows are represented with a solid line with no arrows depicting energy movements. For example, when fuel ceases to flow from FUEL 128 to aircraft engines ENG 1 130 and ENG2 126, the connection between these systems is represented by a solid line 148.

Figure 2A:
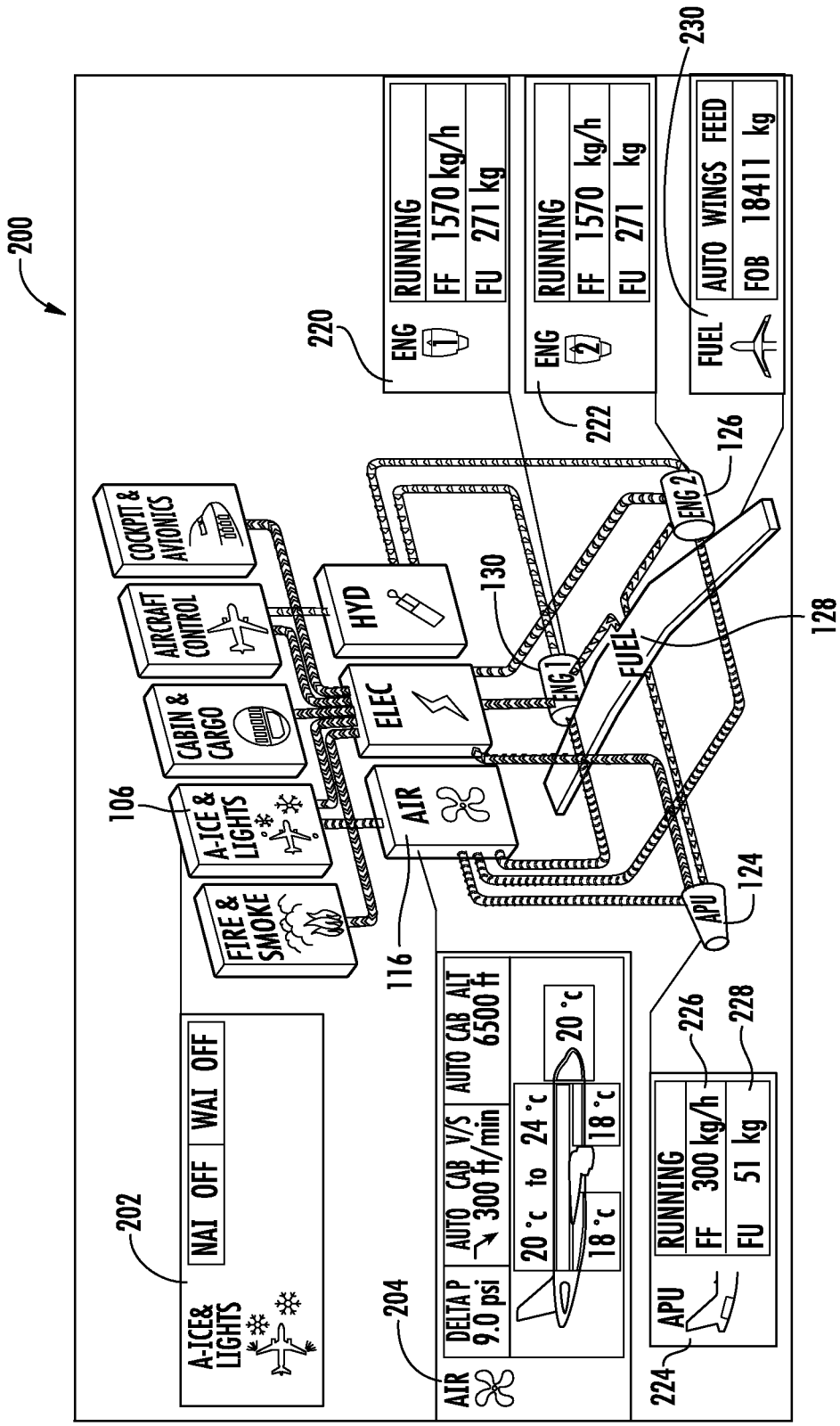
FIG. 2A is an exemplary embodiment of a global visualization interface with multiple inserts displaying aircraft systems information in accordance with aspects of the subject matter described herein.
Figure 2B:
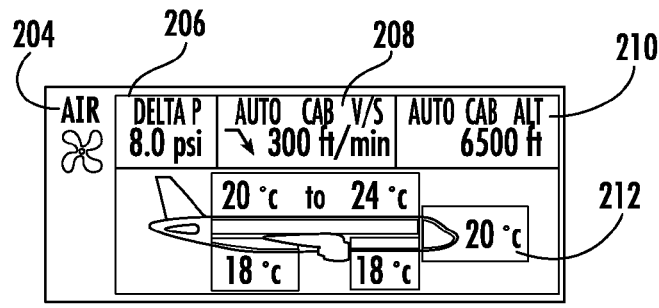
FIGS. 2B to 2G are exemplary embodiments of inserts displaying aircraft information in accordance with aspects of the subject matter described herein.
Figure 2C:
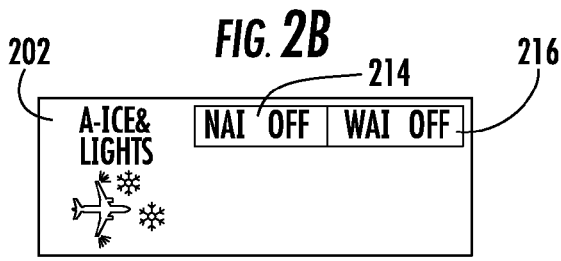
Figure 2D:
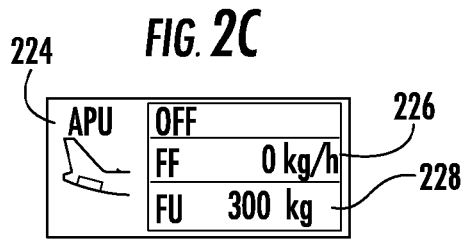
Figure 2E:
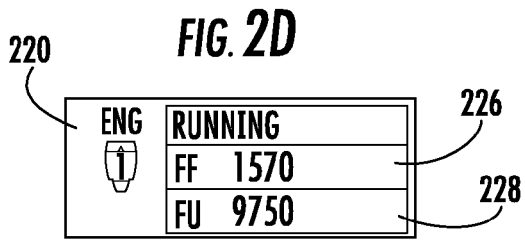
Figure 2F:
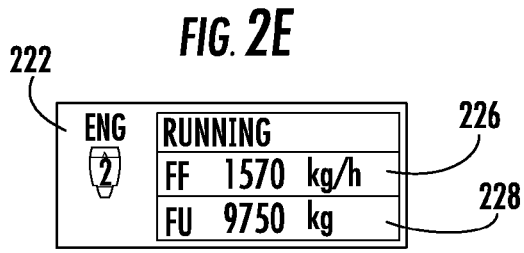
Figure 2G:
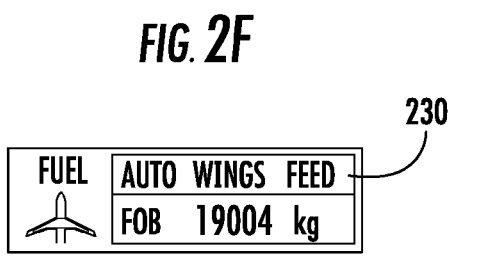

In some aspects, contextual and/or supplemental information are displayed along sides of the graphic objects representing aircraft systems to provide additional systems data to aircraft operators. FIG. 2A is an exemplary embodiment of a global visualization interface, generally designated 200, with inserts displayed for multiple graphic objects for providing additional systems information during different phases of a flight, in accordance with aspects of the subject matter described herein. Inserts are graphic icons placed on an interface configured to display systems information about an associated aircraft system. For example, an AIR 204 insert is placed next to the graphic object AIR 116 and configured to display additional aircraft status information. As illustrated in FIG. 2B, the AIR 204 insert is configured to display aircraft status information such as effective cabin air pressure 206, effective cabin airspeed 208, effective cabin altimeter 210, and temperatures 212 at different segments of the cabin section. Similarly, an A-ICE & LIGHTS insert is placed next to the graphic object A-ICE & LIGHTS showing that both nacelle anti-ice system 214 and wing anti-ice system 216 are switched off, as illustrated in FIG. 2C. Furthermore, APU 224 insert, ENG 1 220 insert, and ENG 2 222 insert are provided to include information such as fuel flow rate 226 and fuel usage 228 of the APU 124, ENG 1 130, and ENG 2 126 systems, as illustrated in FIGS. 2D to 2F. In addition, a FUEL 230 insert is displayed next to the FUEL 128 system icon. As illustrated in FIG. 2G, the FUEL 230 insert is configured to display information such as wing fuel tank operation mode and amount of fuel on board. It should be noted that other inserts can be conveniently inserted and displayed to provide other systems information as needed, the examples provided here are to explain the subject matter and not as a limitation.

Figure 3:
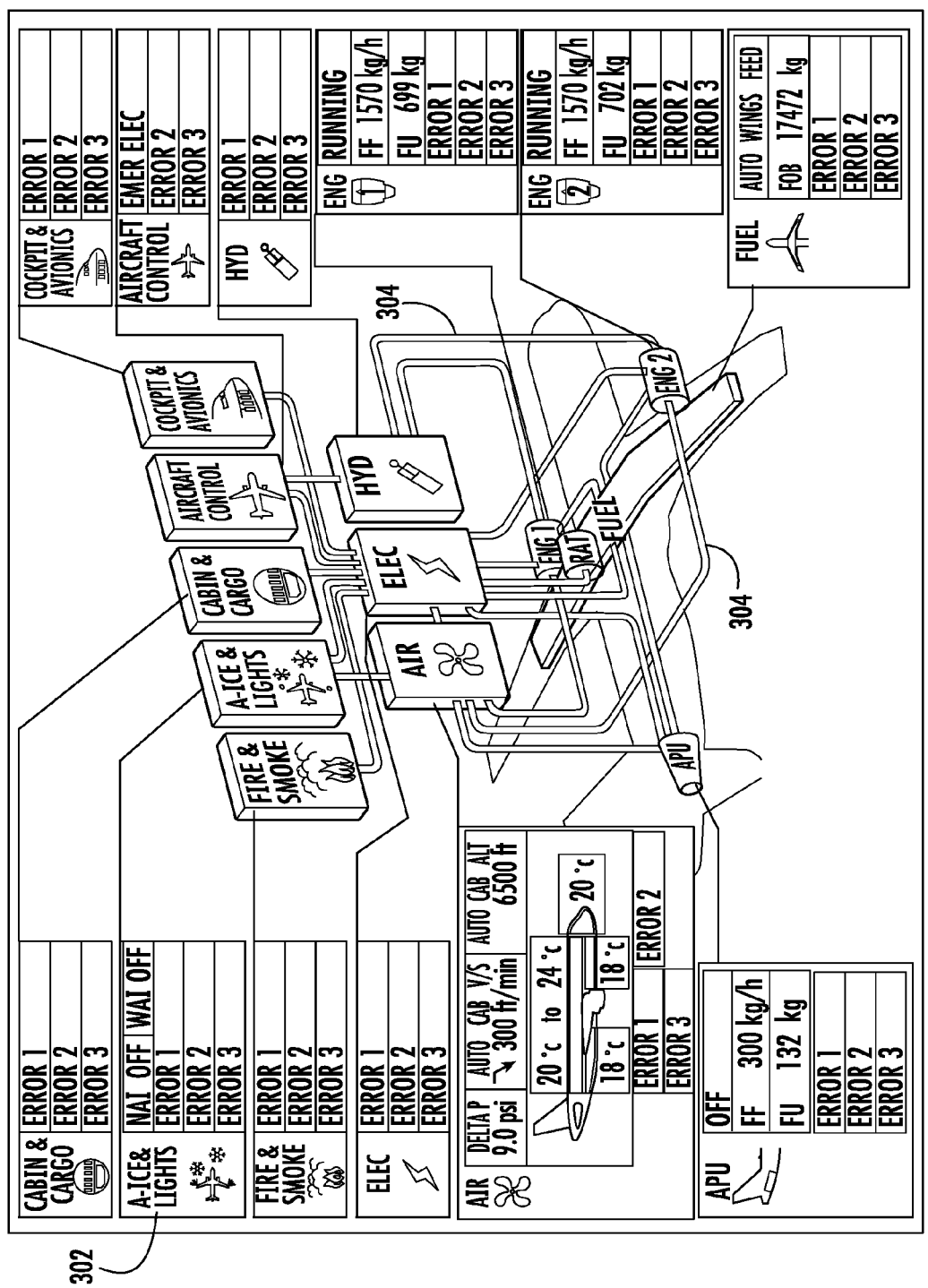
FIG. 3 is an exemplary embodiment of a global visualization interface with multiple inserts displaying system error messages in accordance with aspects of the subject matter described herein.

In some aspects, the inserts are also useful to display, for each system, breakdown diagnoses when a system failure has occurred, as illustrated in FIG. 3. For example, an A-ICE & LIGHTS 302 insert indicating at least one or more error status for an aircraft's A-ICE & FIRE system is placed on a global visualization interface 300 as depicted in FIG. 3. Furthermore, in situations where multiple errors have occurred within a single system, the errors are listed in an order determined by a flight database onboard the aircraft or according to standard operating procedure guidelines. For example, as shown in FIG. 3, the A-ICE & LIGHTS insert 302 is configured to display at least 3 errors, error 1 being the most critical whereas error 3 has the least impact (compared to the other 2 errors) on the aircraft. Similarly a breakdown in the energy flow between at least two systems is illustrated by a solid line 304, without arrows indicating any flow. When multiple systems are experiencing failures, corresponding inserts are displayed on the global visualization interface 300 as shown in FIG. 3. As such, an aircraft operator has an overall picture of the failures of the aircraft, which enables the operator to coordinate his or her actions quickly, notably when the system cannot formulate any prescribed resolution plan.

Figure 4:
FIG. 4 illustrates tab controls for navigating between a global view, a local system management view, and a task view in accordance with aspects of the subject matter described herein.

In some aspects, a system management interface configured for managing at least one or more aircraft system is accessible by interacting with an insert or a graphic object representing one or more functions realized by the considered system. The interface can be that can be a local system management interface for local control on an aircraft. A user or operator interacts with the insert or the graphic object through any suitable technique, for example such as by tapping the insert on a tactile screen, or selecting the insert using an interactive device such as a computer mouse. Selecting an insert or the graphic object representing an aircraft system grants the operator access to a local system management interface of that system. For example, as illustrated in FIG. 4, one or more tab controls are available for navigating between a global view, a local system management view, and a task view of aircraft systems. For example, when an aircraft operator selects a system icon or a tab or the insert associated with the FUEL 128 system, a new mitre 400 or interface opens up and provides a way to manage that system locally. Furthermore, an additional interface icon 402 becomes available on the local system mitre 400 and provides a quick path back to the global visualization interface 100. As such, this configuration allows an aircraft operator to quickly access a particular system and just as quickly return to the global overview interface.

Figure 5A:
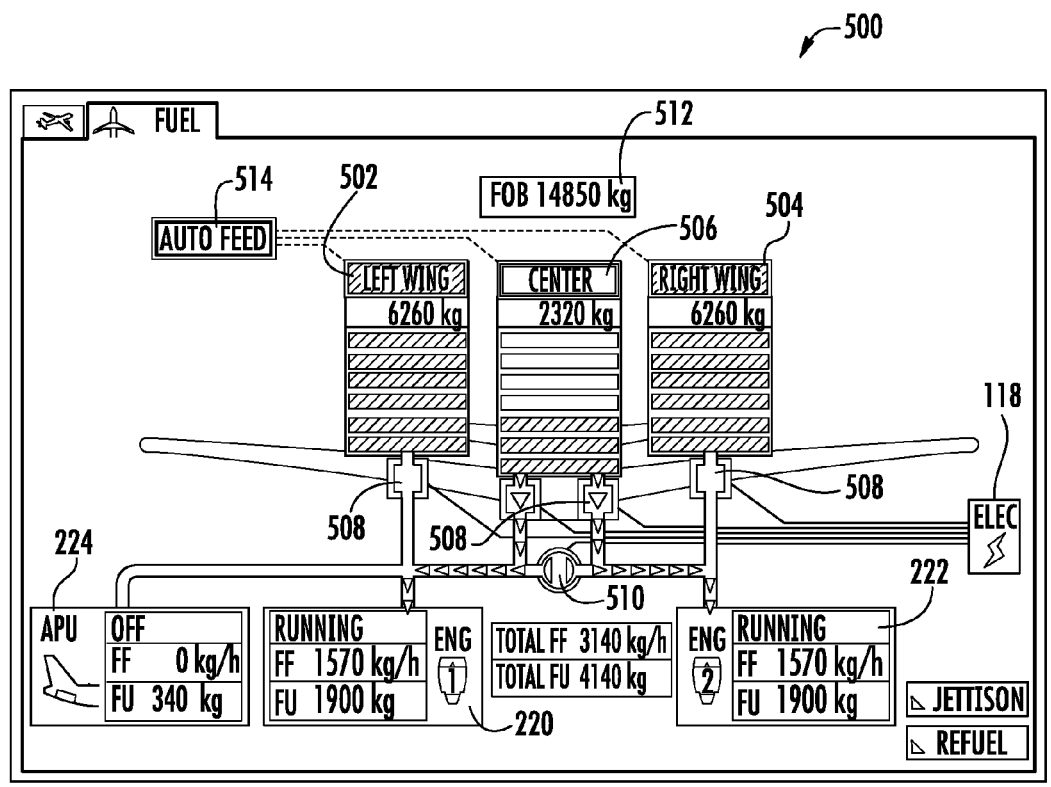
FIG. 5A is an exemplary embodiment of a management interface for an aircraft system in accordance with aspects of the subject matter described herein.

In some aspects, an operator is capable of accessing and/or managing an aircraft system through a dedicated management interface. For example, FIG. 5A depicts an exemplary illustration of a system management interface, generally designated 500, for managing an aircraft's fuel supply in accordance with aspects of the subject matter described herein. As shown in FIG. 5A, the management interface 500 displays the current status of the aircraft's hydrocarbon containing system, such as quantities of fuel, flow of the fuel, and operations of the fuel pumps. Also shown on the management interface 500 are system components of the fuel supply system (e.g. pumps, valves, fuel tanks, etc.) represented by graphic objects and a virtualized layout of the system including the fuel tanks, valves and pumps. As illustrated in FIG. 5A, the system components are placed on the interface in one aspect in reference or relation to their physical locations on the aircraft. For example, the real fitting of the fuel tanks on the aircraft is reproduced on the management interface 500 by indicating on the left a representation of the fuel tank present in the left wing 502 and on the right a symbol representing the fuel tank of the right wing 504. Similarly, a CENTER 506 fuel tank is placed between the LEFT WING 502 and RIGHT WING 504 fuel tanks representing the fuel stored in the aircraft's central fuselage. Each fuel tank has at least one or more pump 508 for controlling the fuel flow and is connected to aircraft systems represented by inserts such as the APU 224, ENG 1 220 and ENG 2 222 inserts. There is also a valve 510 for controlling the fuel flow to various aircraft systems and powered by the ELEC 118 distributor system. In the event of failure of the aircraft electrical system, ELEC 118 provides quick access to a management interface to the aircraft's electrical system. In some aspects, the amount of fuel available is displayed both numerically and graphically. For example, fuel-on-board 512 is displayed numerically on top of the management interface 500, and so is the amount of fuel available in each tank. However, each tank also depicts the amount of fuel available graphically, for example, as stacked blocks similar to a cell phone displaying the amount of battery power left. In addition, the circulation of the fuel is also displayed. For example, a line of arrows coming out of the fuel tanks and into aircraft systems represent the movement of aircraft fuel. This configuration provides an overview of the aircraft's fuel system and allows an operator to act quickly.

In some aspects, system function sequences are activated following one or more prescribed sequences. For example, the fuel carburizing system is configured to operate in an AUTO FEED 514 mode by default, which gives an operator full authority to configure the fuel supply according to procedures determined by priorities set by a flight database onboard the aircraft or in standard operating procedure guidelines. The determination of priorities takes into consideration factors such as different flight phases, the operating aircraft systems, and/or any breakdowns or aircraft system failures. Under the AUTO FEED mode, the CENTER 506 fuel tank would be exhausted first, followed by the LEFT WING 502 and RIGHT WING 504 tanks, thereby reducing stresses undergone by aircraft wing structures during cruising.

Figure 5B:
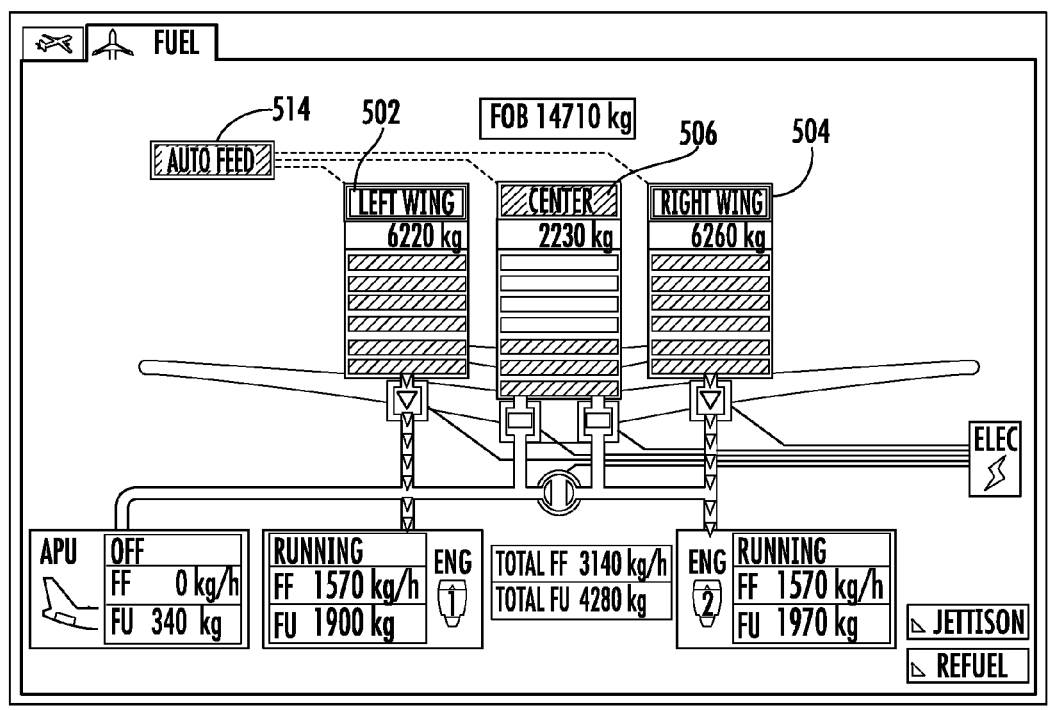
FIGS. 5B to 5H are exemplary embodiments of an aircraft operator performing system management through the management interface in accordance with aspects of the subject matter described herein.

In some aspects, an aircraft operator is fully authorized to activate or deactivate a system component through user interaction with a graphic object on the management interface. For example, by tapping on the graphic object representing a fuel tank, an operator is manually selecting and/or deselecting the tank independently of other system components, and the FUEL 500 management system will reconfigure the pumps 508 and valves 510 automatically in order to adequately supply fuel to all aircraft systems, starting from the activated fuel tank. This configuration is referred to as the "functional interaction", as it is abstracted from the equipment which is programmed to execute the settings as configured in a strict manner, such as open and close valves 510, or start and/or stop the fuel pumps 508. Functional interaction is an improvement over current systems, where an aircraft operator is required to toggle multiple switches in a prescribed order to configure valves and pumps to reroute the fuel supply. Centralizing the controls in the FUEL management interface 500 not only lightens the workload of the operator, but also reduces overall risk due to human errors. In some aspects, as illustrated in FIG. 5B, an operator deselects the CENTER 506 tank and selects the LEFT WING 502 and RIGHT WING 504 tanks, at which point the AUTO FEED 514 mode is automatically disabled. In some aspects, interacting with graphic objects on the management interface allows an aircraft operator to activate a manual feed mode for supplying fuel to aircraft fuel tanks and/or for removing fuel from aircraft fuel tanks. For example, by tapping graphic objects representing fuel valves on the local system management interface, the aircraft operator can adjust aircraft fuel levels in the aircraft's left wing tank, right wing tank, center tank, or a combination thereof.

Figure 5C:
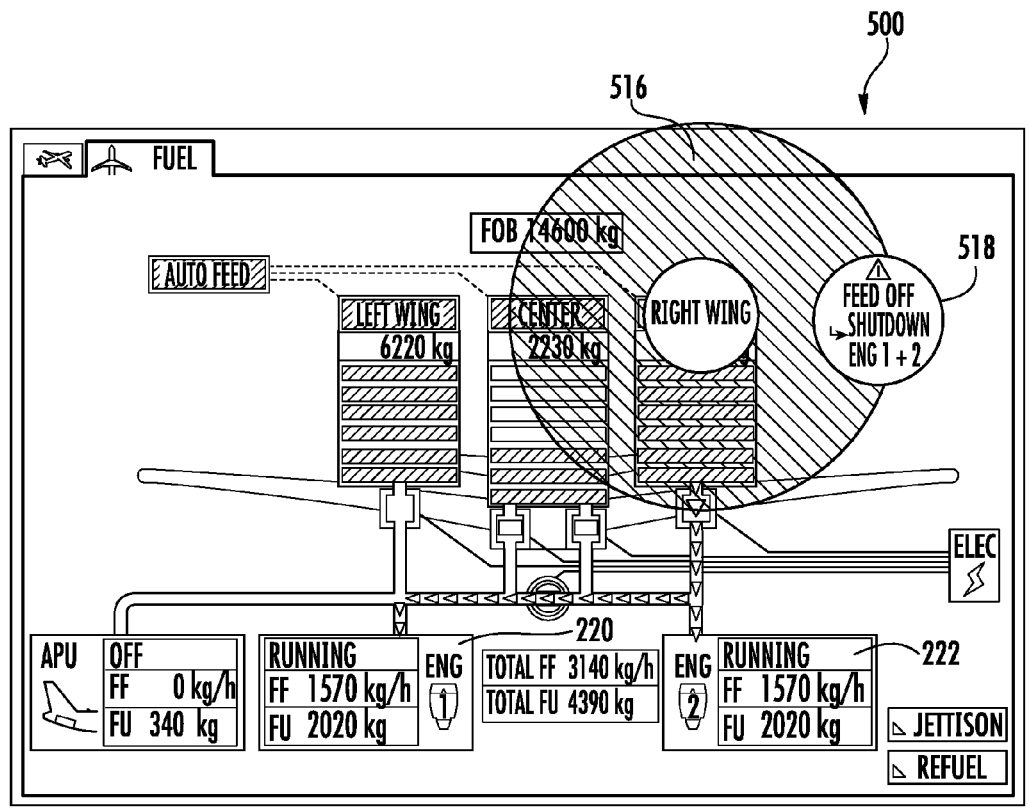

In some aspects, inappropriate configuration commands or operating procedures that would put an aircraft in potential danger is prevented by a safeguard mechanism. For example, as illustrated in FIG. 5C, when only the RIGHT WING 504 tank is supplying fuel to both engines (ENG 1 220 ENG 2 222), deselecting and therefore closing off the RIGHT WING 504 tank would effectively cut off the fuel supply to the aircraft completely. To prevent this type of situation from occurring, a confirmation to take action is requested by the system and displayed on the interface 500. For example, "zone at risk" 516 is displayed over the RIGHT WING 504 tank, conspicuous and wide enough to draw attention from the operator. At the same time, the order to deselect the RIGHT WING 504 tank is blocked and potential risk of the action is displayed on a command icon 518. The safeguard mechanism will require the operator to take a specific interaction, such as drag the command icon 518 into the center of the zone at risk 516 to confirm the execution of the operator's command. This mechanism will work with other fuel tanks in a similar fashion, and can eliminate unintentional commands and notify aircraft operators to consequential operational risks.

Figure 5D:
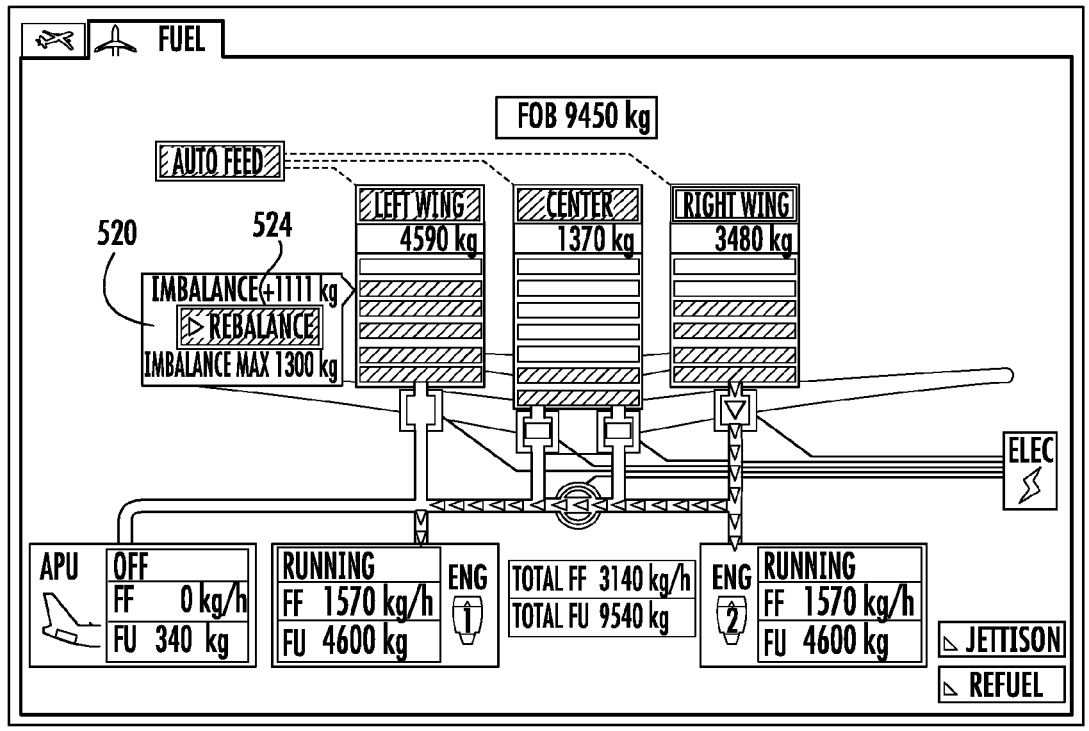
Figure 5E:
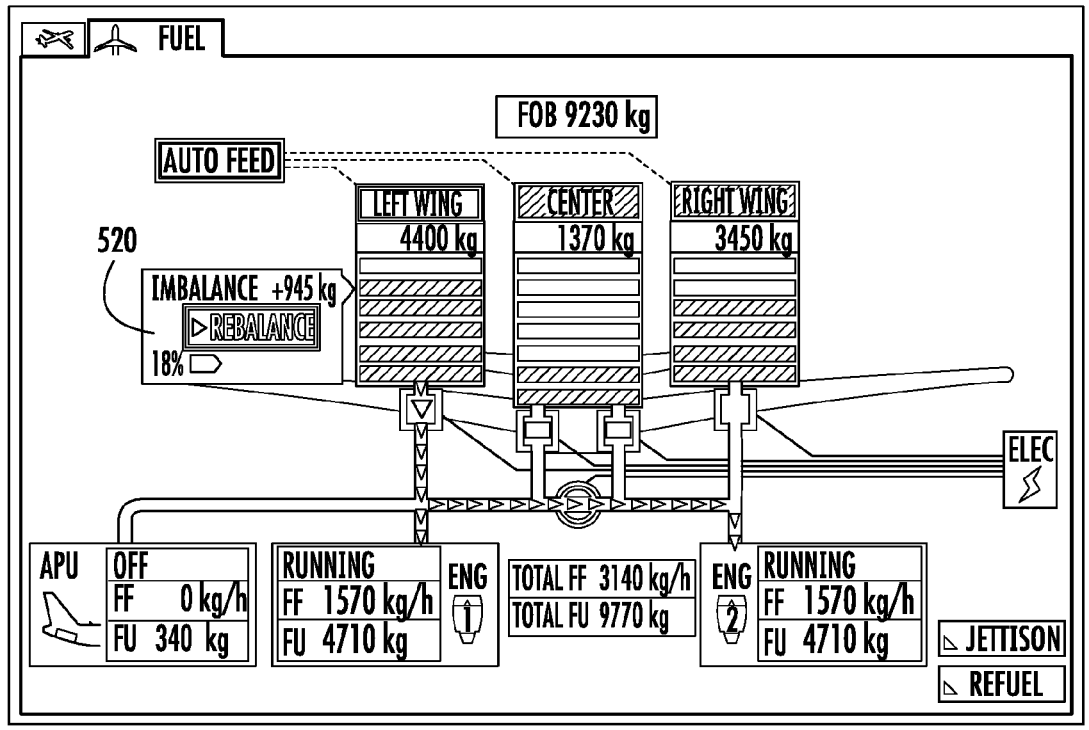

In some aspects, the FUEL 500 management interface is also configured to manage abnormal system configurations and failures. For example, under AUTO FEED mode, the difference in the amount of fuel in the left and right wing tanks is automatically maintained at or below a threshold level (e.g. 300 kg), such as for example by activating a rebalancing mechanism at convenient times throughout a flight. However, when an operator disables the AUTO FEED mode and puts the fuel system in a different configuration, an imbalance of amount of fuel between the tanks can develop. When the imbalance exceeds a threshold level (e.g. 300 kg), a contextual icon will appear to indicate the imbalance and ask for rebalancing of aircraft fuel between the two tanks. For example, as illustrated in FIG. 5D, rebalancing icon 520 is displayed next to the fuel tanks indicating a fuel imbalance exceeding the threshold level. A proposed procedure box 524 appears within the rebalancing icon 520 depicting the proposed command needed to rebalance the fuels. The operator can select and confirm the command, at which point fuel flow between the tanks is automatically initiated to correct the imbalance, as illustrated in FIG. 5E. In comparison, systems in use today require an aircraft operator to rebalance the fuel through a procedure consisting of opening and closing a series of valves and pumps, and then to reactivate the valves and pumps once a balance has been achieved. The part of reactivating valves and pumps is regularly forgotten by operators and thus reverses the fuel imbalance. The present subject matter drastically simplifies the rebalancing process for the operator, as well as making it more reliable and safer. It should be noted that other system functions or anomalies can also be conveniently brought to an operator's attention and then corrected by the method described herein. The example of fuel imbalance is provided here to explain the subject matter and not as a limitation.

Figure 5F:
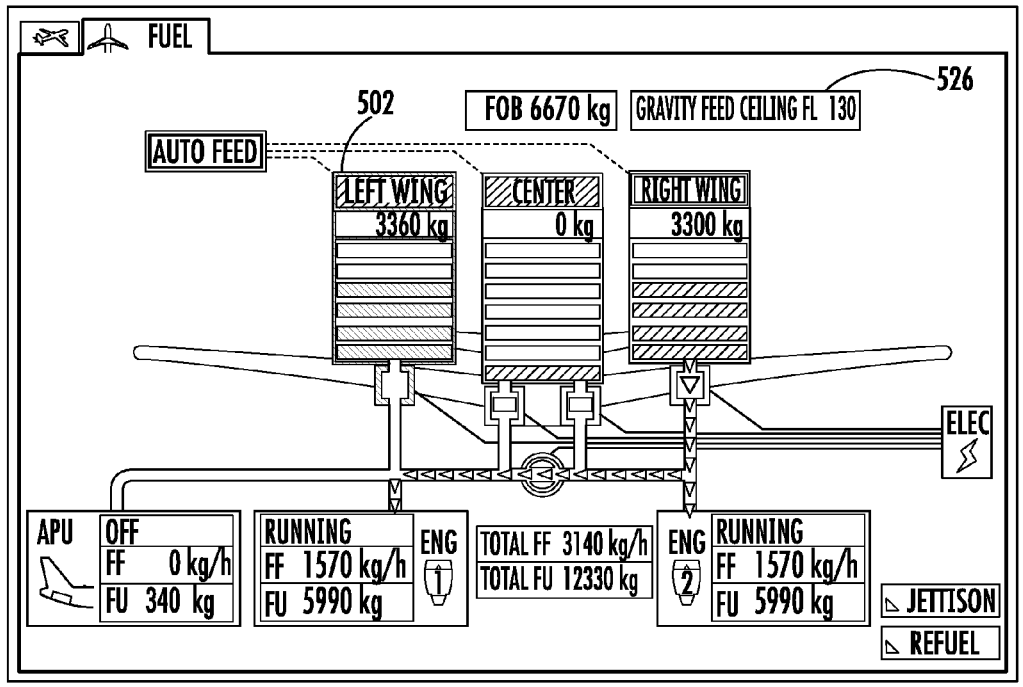
Figure 5G:
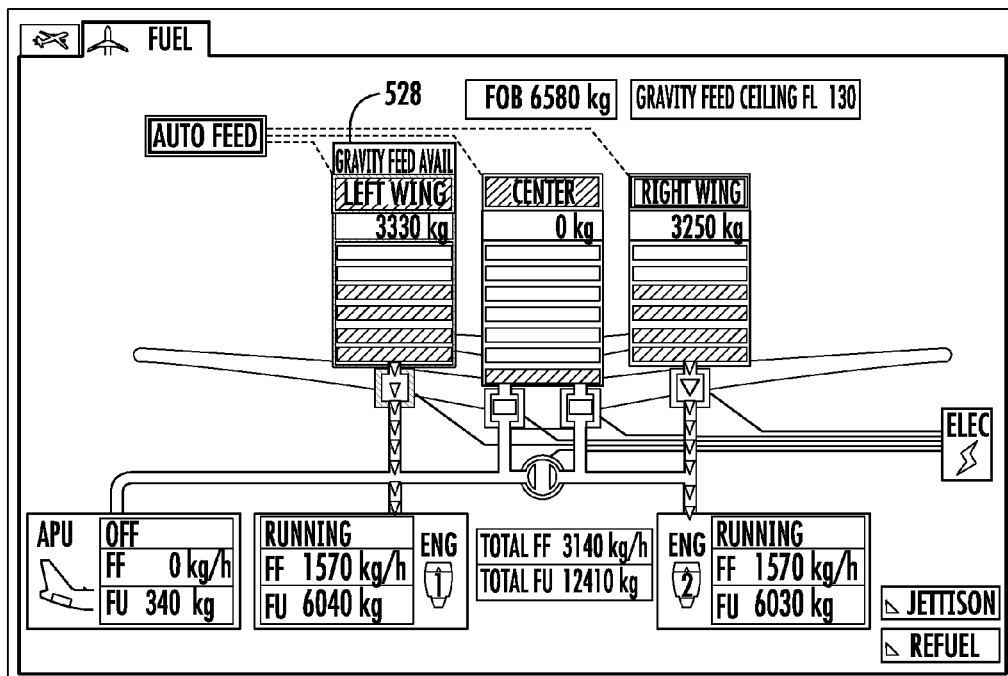

In some aspects, under certain operational conditions, when a fuel tank fails to function, it is possible to still draw fuel from that tank using gravity. For example, as illustrated in FIG. 5F, when a fuel tank ceases to operate (e.g. the LEFT WING 502 fuel tank), the FUEL 500 management interface indicates to the operator that such fuel will not be usable directly (e.g. change the displaying color of the fuel in the faulty tank), but will become available when the aircraft passes under a particular flight ceiling. For example, for Airbus A320 aircraft, once the plane passes under a GRAVITY FEED CEILING FL 130 526 as indicated on the management interface 500, a GRAVITY FEED AVAIL indicator 528 appears on top of the LEFT WING 502 icon to indicate the activation of gravity enabled fuel feeding, as illustrated in FIG. 5G.

Figure 5H:
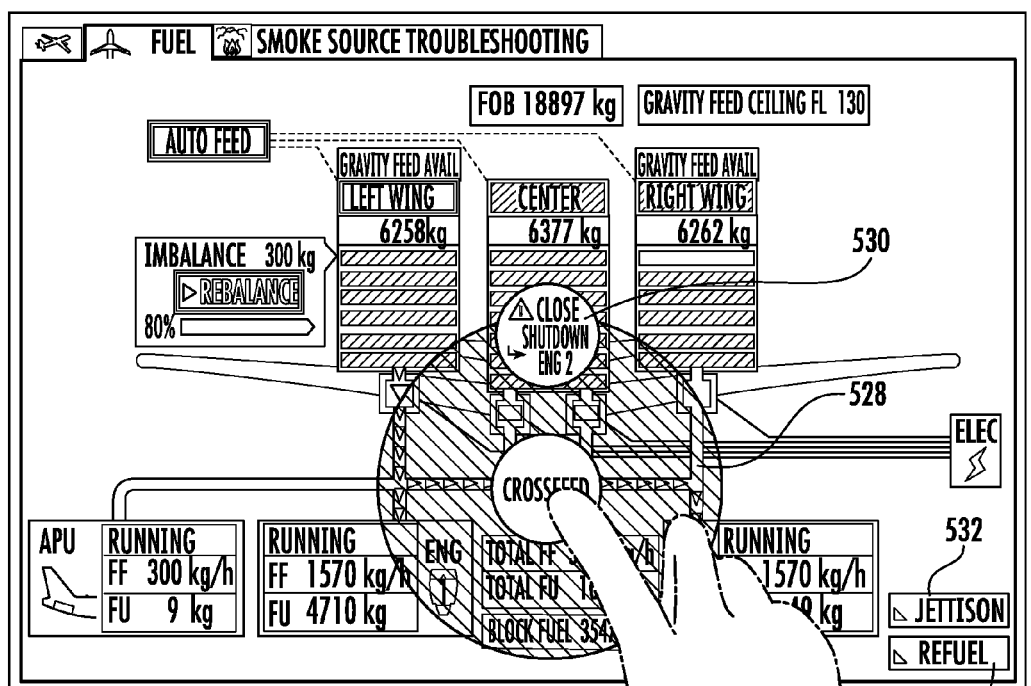

In some aspects, an aircraft operator has the option to directly control the pumps 508 and valves 510 of the fuel system for managing an unprescribed emergency situation such as a fuel leak not detected by onboard sensors. However, the safeguard mechanism is still present as a safety net, preventing the operator from executing potentially disastrous commands. For example, as illustrated in FIG. 5H, to close off the valve 510, a "zone at risk" 528 is displayed over the valve 510, wide enough to draw attention from the operator. At the same time, the command to close the valve 510 is blocked and potential risk of the action is displayed on a command icon 530. The safeguard mechanism will require the operator to take a specific interaction, such as for example to drag the command icon 530 into the center of zone at risk 528 to confirm the execution of the operator's command.

In addition, in some aspects, command icons such as JETTISON 532 and REFUEL 534 are also placed on the FUEL management interface 500, allowing quick configuration and execution of refueling the plane on the ground or jettison fuel in the air. It should be noted that other quick access command icons can be conveniently placed on a system management interface for fast execution of prescribed configuration commands. In addition, in some aspects, system function sequences such as JETTISON 532 and REFUEL 534 require a configuration phase before execution. For example, aircraft fuel balancing parameters need to be collected and analyzed before adding or jettisoning fuel to or from the aircraft.

In some aspects a prescribed situation can occur when onboard sensors detect a smoke source and responses are prescribed for an aircraft operator to resolve the fault. In current practice, task-specific action sequences such as smoke source troubleshooting procedures are performed through several onboard interfaces, including a task-specific action sequence presented in a printed Quick Reference Handbook, a series of "ON/OFF" commands for potential sources disposed in an overhead panel, systems reconfiguration controls disposed across the cockpit for reallocating communication frequencies on non-shutdown radio controls, and a display of potential sources on a plurality of system pages and overhead panel lights. In this situation of a smoke source, the interactive system provides an integrated task view that supports the execution of a simplified procedure for troubleshooting the smoke source while providing direct "ON/OFF" commands on potential smoke sources, displaying current states of these potential sources, and automatically reallocating system resources. This advantageously allows the operator to have a better understanding of the troubleshooting process, to be more efficient at finding the smoke source, and to be exposed to a reduced risk of command error, thereby improving the safety of the aircraft when a non-sensed smoke source is identified. In some aspects, performing an action sequence comprises reconfiguring a shutdown system to another resource and providing a backup capability. For example, during a smoke source troubleshooting sequence, the sequence shuts down one electrical generator while keeping the other generators operational.

Figure 6A:
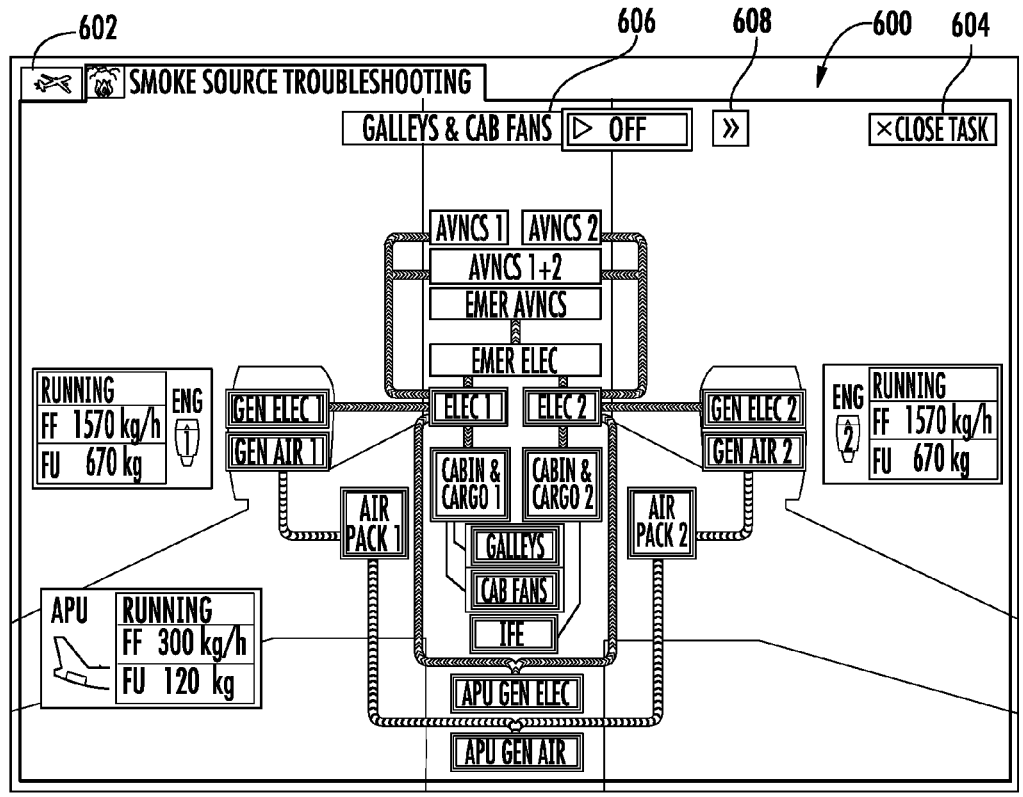
FIG. 6A is an exemplary embodiment of a task-specific interface in accordance with aspects of the subject matter described herein.

In some aspects, the interactive system described in the present subject matter prescribes a task to be performed by the operator and then illustrate a task view at an appropriate time. In addition, the operator has the option to activate a particular task view from a pre-defined list when the operator detects an event not picked by the aircraft's sensors. For example, as illustrated in FIG. 6A, when smoke is detected by the operator, a task-specific interface such as SMOKE SOURCE TROUBLESHOOTING 600 interface is activated for finding the source of the smoke. The SMOKE SOURCE TROUBLESHOOTING 600 interface is configured to diagnose and repair a malfunctioning aircraft system and includes interactive icons such as a tab control 602 for a quick navigation back to a global system view and a manual control icon 604 for disabling the TROUBLESHOOTING 600 interface. In some aspects, the TROUBLESHOOTING 600 interface allows the operator to follow a prescribed system function sequence by activating a series of macro actions. In some embodiments, the system function sequence can include one or more predefined system functions, for example, as illustrated in FIG. 6A, a macro action icon 606 is displayed on the interface allowing the operator to perform a particular system function, and a manual control icon 608 is also available for navigating to the next system function in the sequence. Also displayed on the TROUBLESHOOTING 600 interface are systems icons that represent possible sources of smoke, which an operator can turn off manually.

Figure 6B:
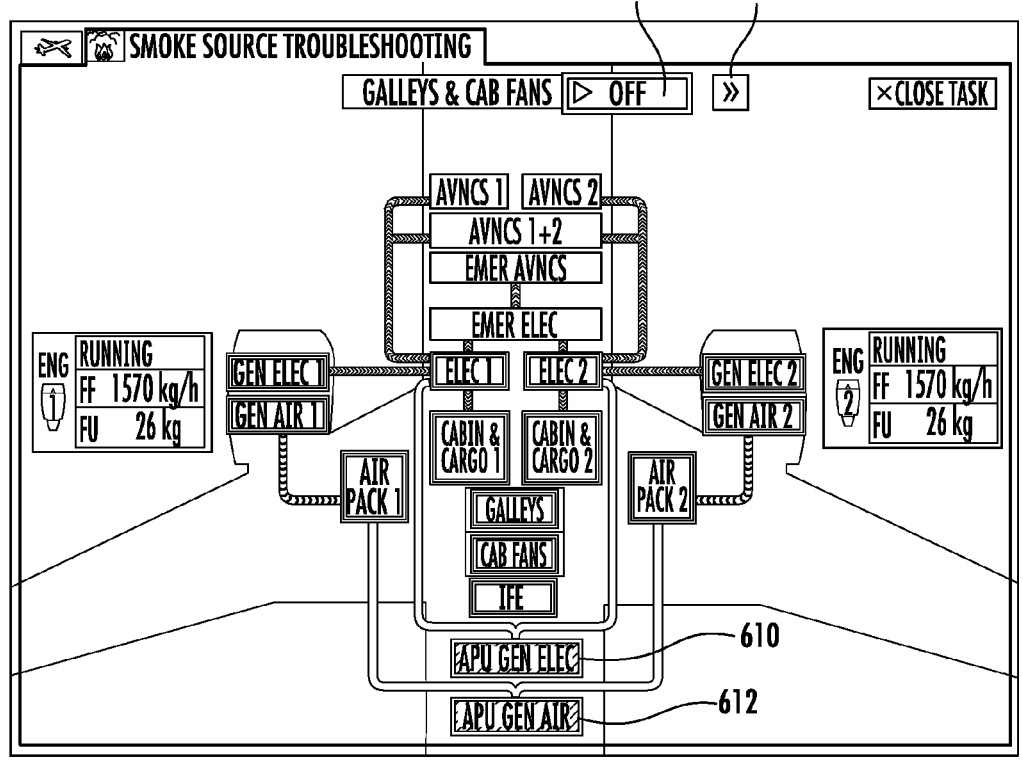
FIGS. 6B to 6H are exemplary embodiments of an automated task-specific action sequence in accordance with aspects of the subject matter described herein.

In some aspects, to determine or pin point the source of the smoke, as illustrated in FIG. 6b, the operator is first requested to shut down the Galleys and Cabin fans, the two most probable causes of smoke emission and dissemination. The operator selects the OFF control on the macro action icon 606, then GALLEYs and CAB FANS are turned OFF, and the next step on the smoke troubleshooting sequence is activated. In this example, the APU is selected to be not running, therefore APU generated electricity and air (APU GEN ELEC 610 and APU GEN AIR 612) are not running as well.

Figure 6C:
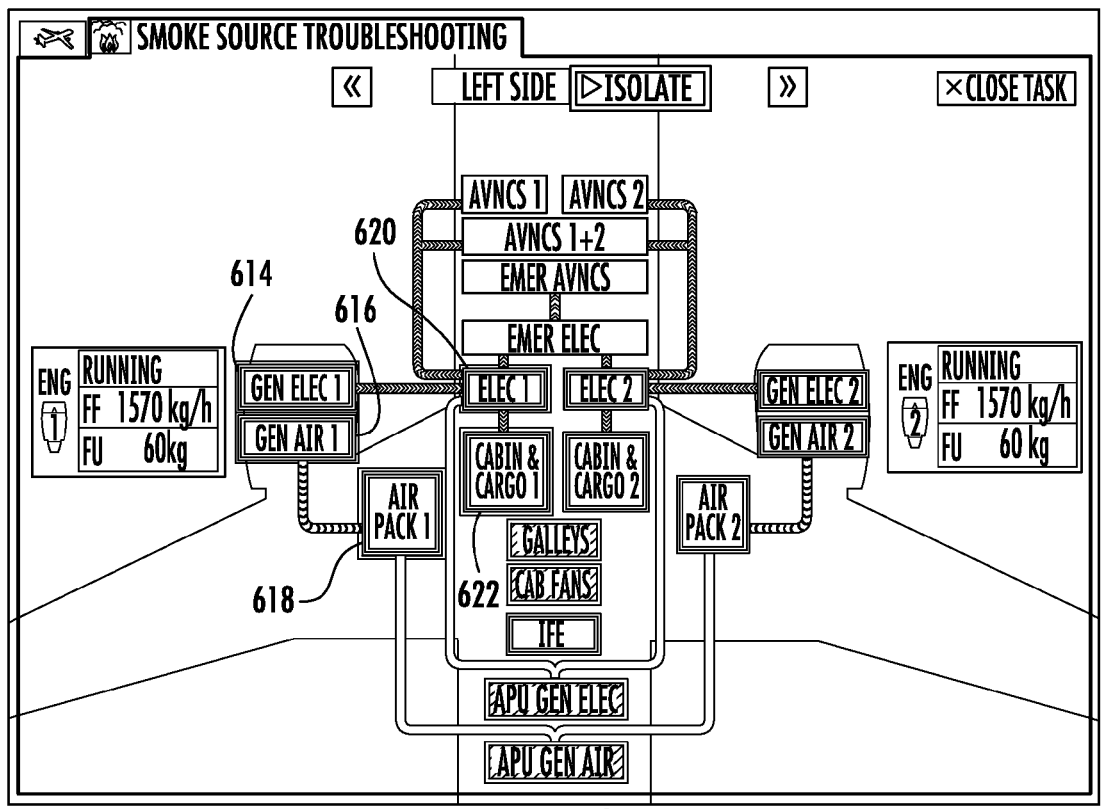
Figure 6D:
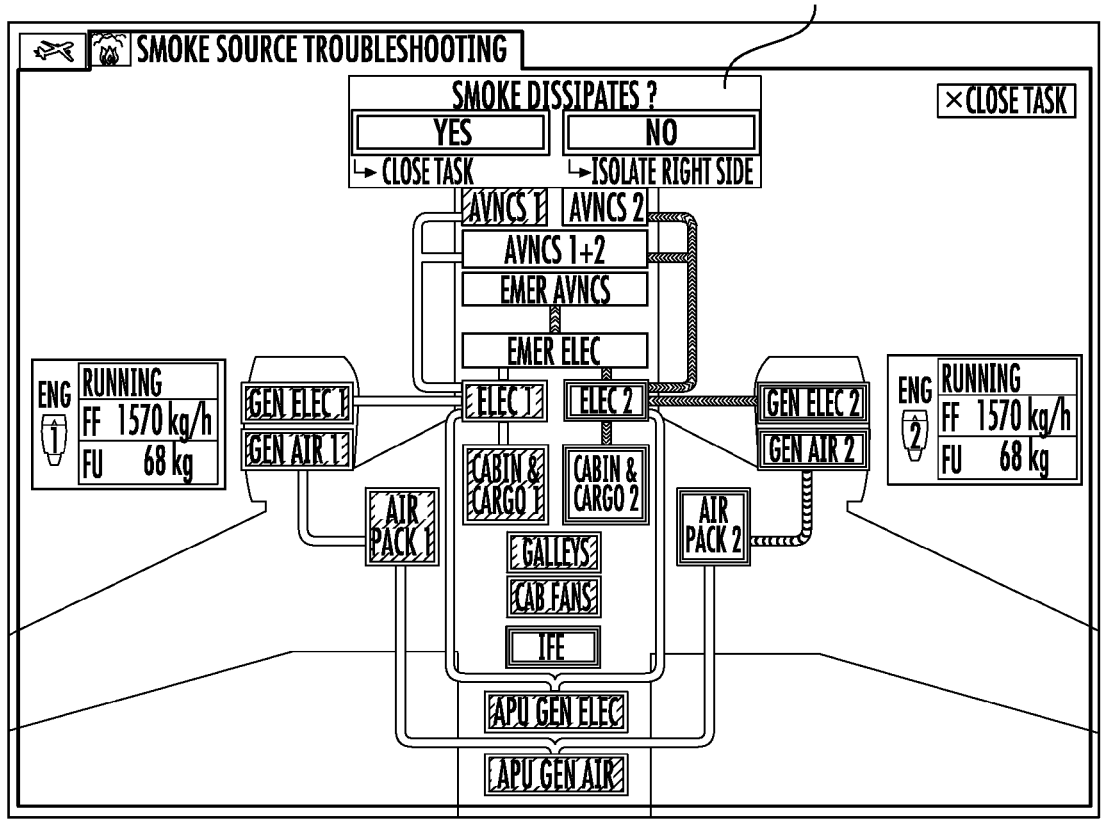
Figure 6E:
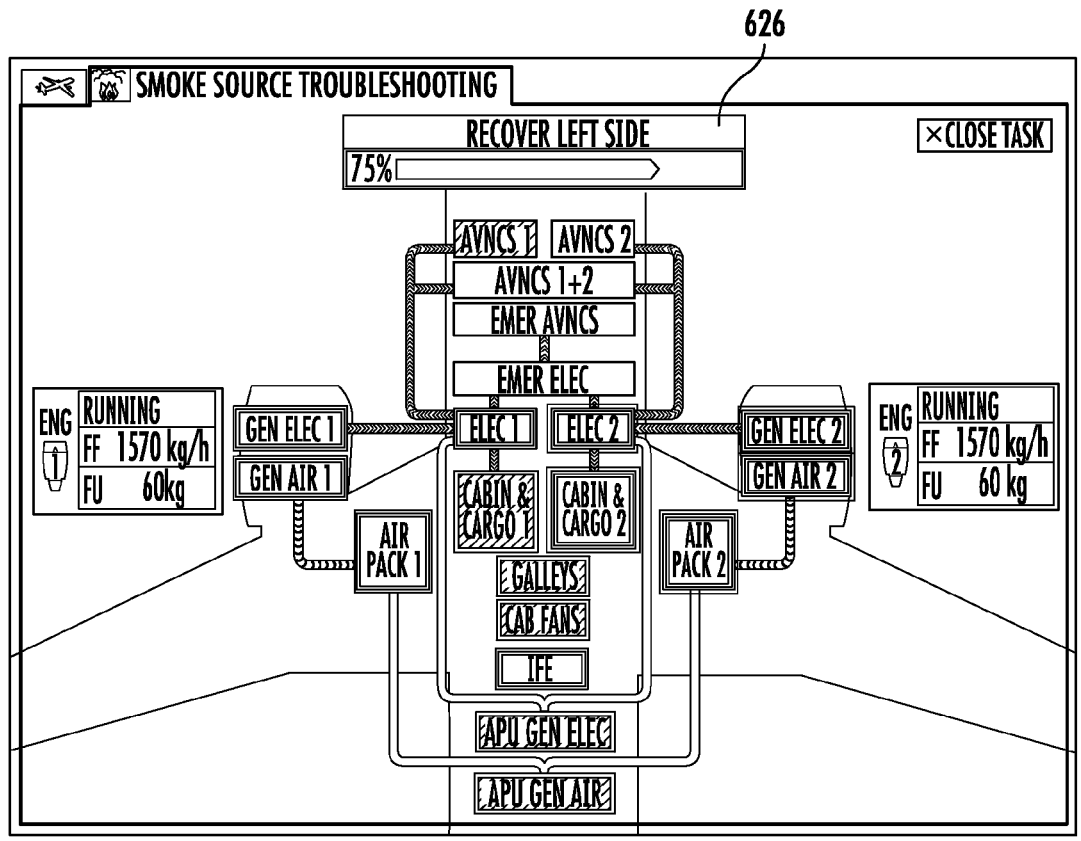
Figure 6F:
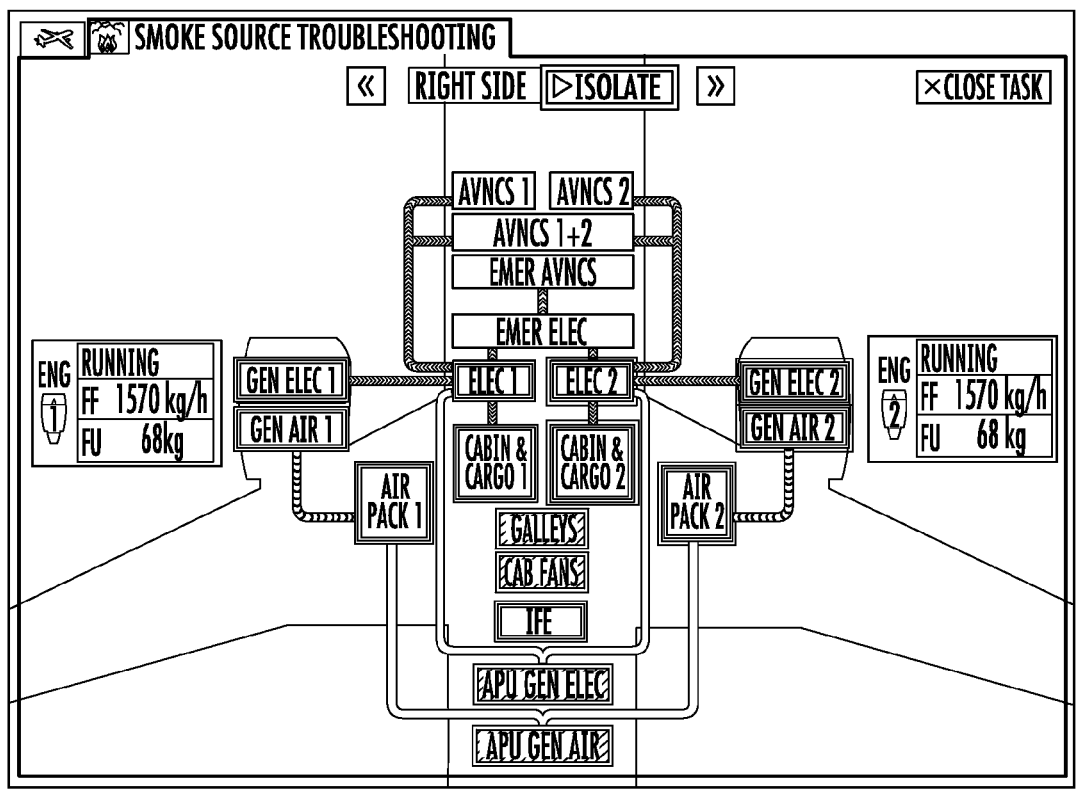
Figure 6G:
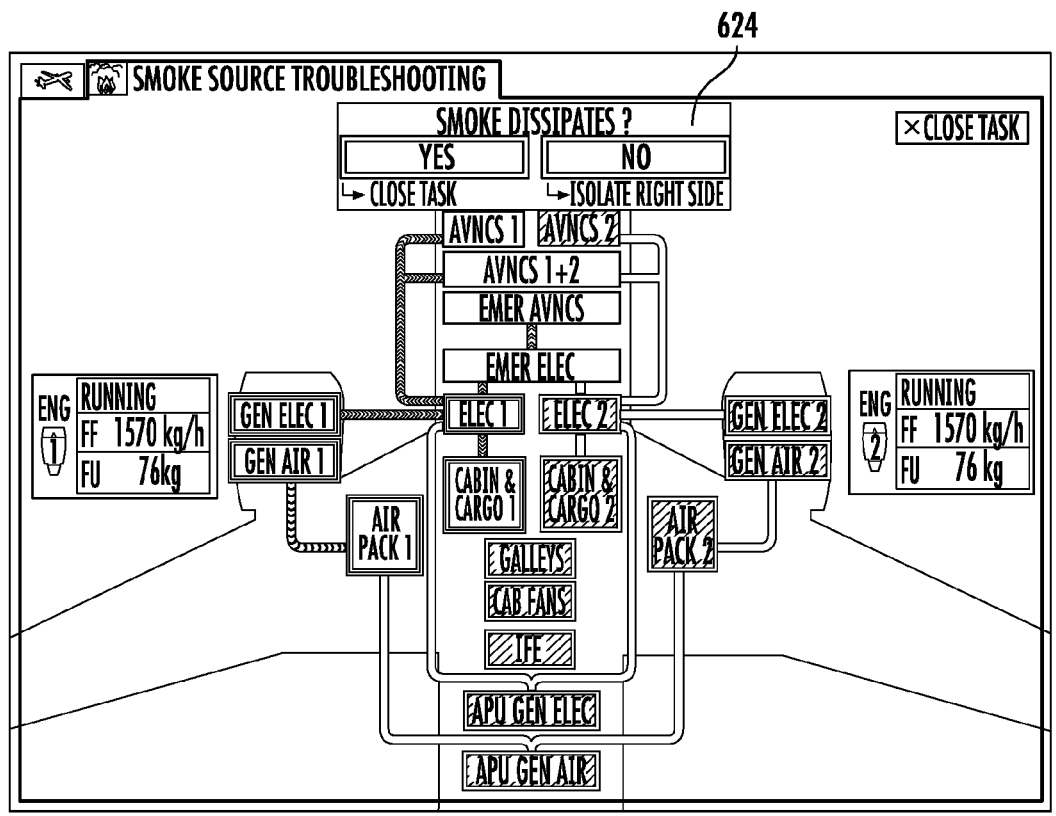
Figure 6H:
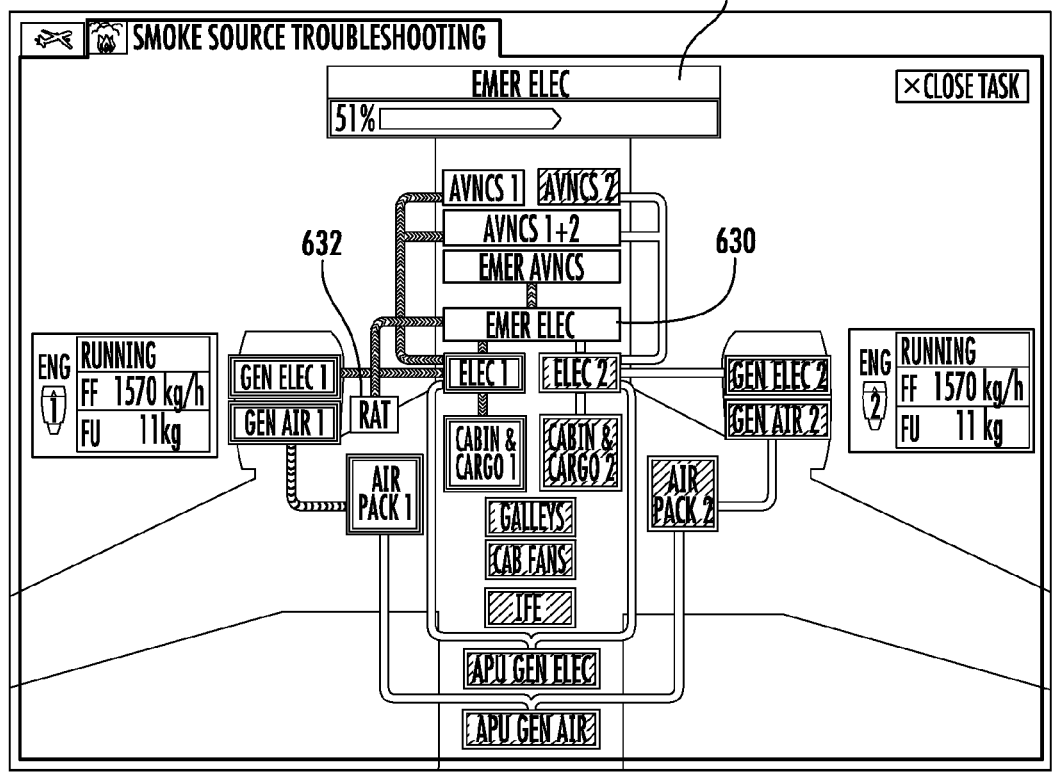
Figure 6I:
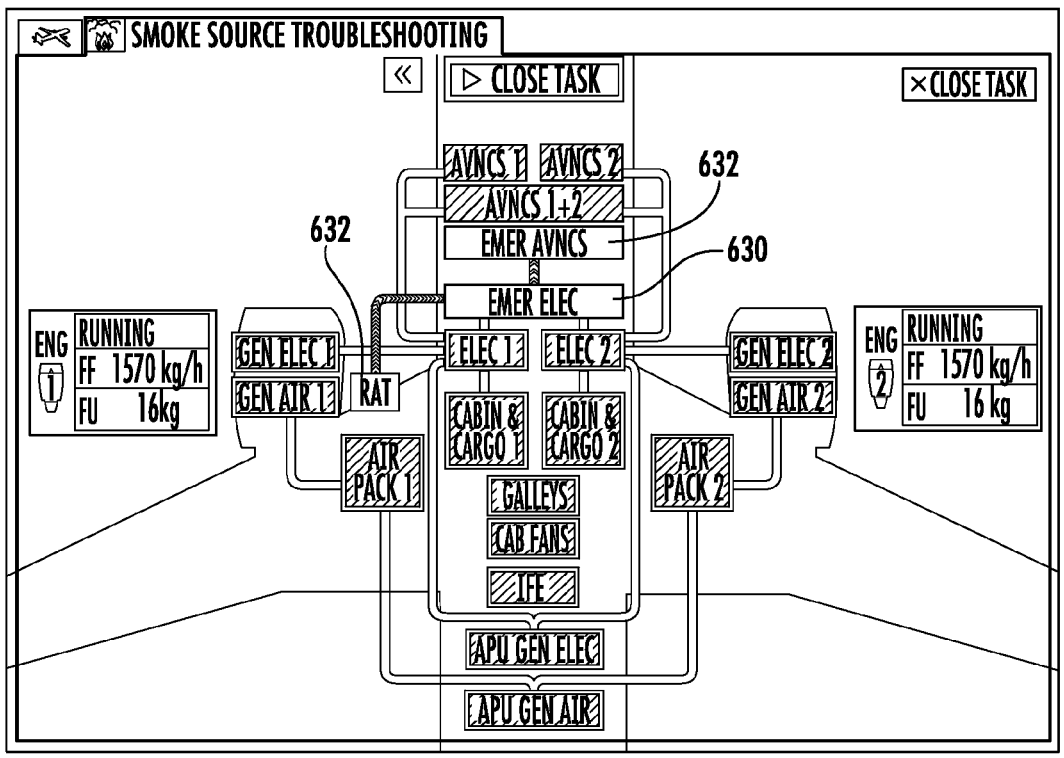
FIGS. 6I to 6M are exemplary embodiments of performing manual troubleshooting on an aircraft system failure in accordance with aspects of the subject matter described herein.

When the first macro action step did not alleviate the smoke issue, the smoke troubleshooting sequence then proceeds automatically to the next step, which is isolating the left side of the aircraft as shown in FIG. 6C. By selecting the macro-action icon 666 again, systems such as the GEN ELEC 1 614, GEN AIR 1 616, AIR PACK 1 618, ELEC 1 620, AND CABIN & CARGO 1 622 will get reconfigured on the right side redundancies and then closed down. Also closed off are associated energy flows between the systems, which are represented as solid lines without arrows indicating no energy movements. Once left side systems are reconfigured and isolated, the operator will be prompted, as shown in prompt box 624, to answer if the smoke has dissipated, without a time limitation, as illustrated in FIG. 6D. If the operator selects "NO" in the prompt box 624, then the left side systems (e.g. GEN ELEC 1 614, GEN AIR 1 616, AIR PACK 1 618, ELEC 1 620, AND CABIN & CARGO 1 622) can be recovered, as shown in FIG. 6E, and a recovery status box 626 appears to indicate the progress of systems recovery. Alternatively, as FIG. 6F illustrates, the aforementioned process is repeated, this time for the right side of the aircraft, isolating the potential smoke sources there. The operator is then prompted to confirm if the macro-action of isolating the right side was effective, as illustrated in FIG. 6G. When the operator selects "NO," the troubleshooting sequence is configured to proceed to the next macro-action of switching on an emergency electrical supply that only keeps emergency electrical systems powered. The deployment of emergency electrical systems is shown, for example, in FIG. 6H, with a status box 628 displayed on the screen indicating the progress of the deployment. The activation of the emergency electrical supply EMER ELEC 630 also activates a ram air turbine RAT 632, and the RAT 632 deploys itself prior to the disconnection of the left side systems. As illustrated in FIG. 6I, the RAT 632 is configured to provide emergency electricity to the EMER ELEC 630 core, which supplies electricity to the emergency avionics EMER AVNCS 632. At this point the operator is then requested to close the task as no further action can be performed to eliminate the smoke source.

This exemplary response method for troubleshooting a smoke source in a reduced number of steps advantageously enables the operating crew members to methodically check the source of the smoke while maintaining a safe and operable aircraft as long as possible. There is also an advantageous reduction in potential errors due to the macro-actions taken that combine potential sources in combinations that will have little detrimental effect to other aircraft operations systems and do not require the operating crew members to memorize a long series of steps to be performed manually in emergency situations. Additionally, the representation of potential smoke source systems gathered on the same view below macro action enable the crew to have an overview of the effect of macro-action on individual systems.

Figure 6J:
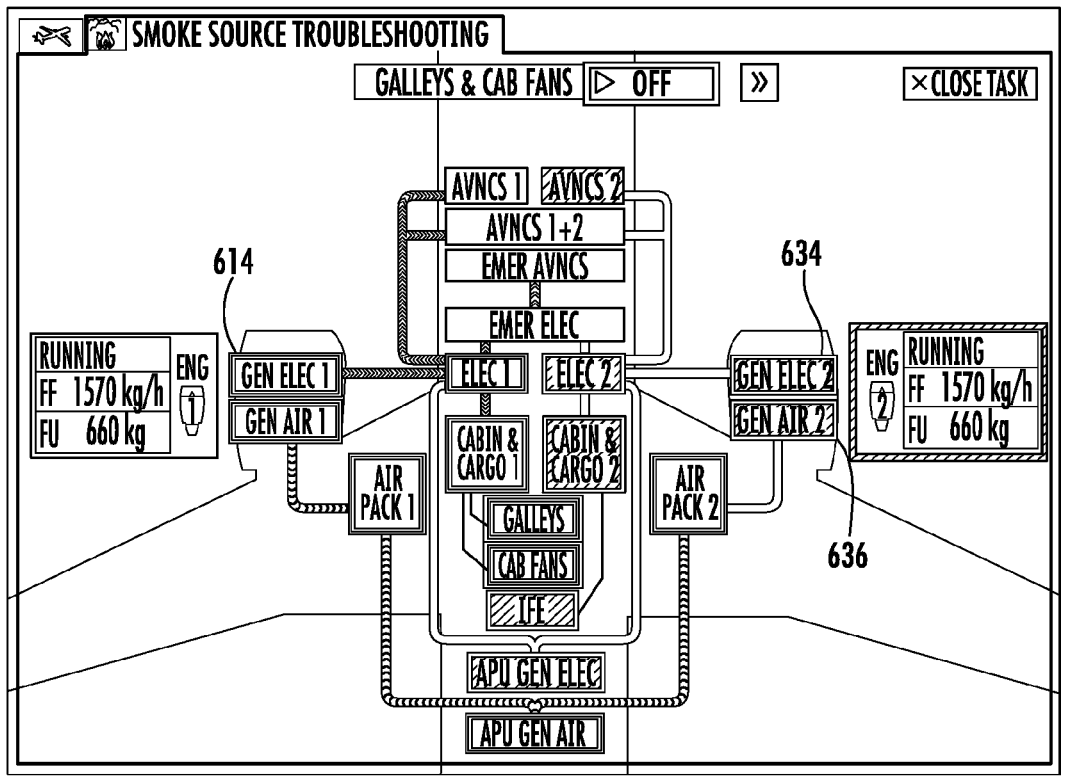
Figure 6K:
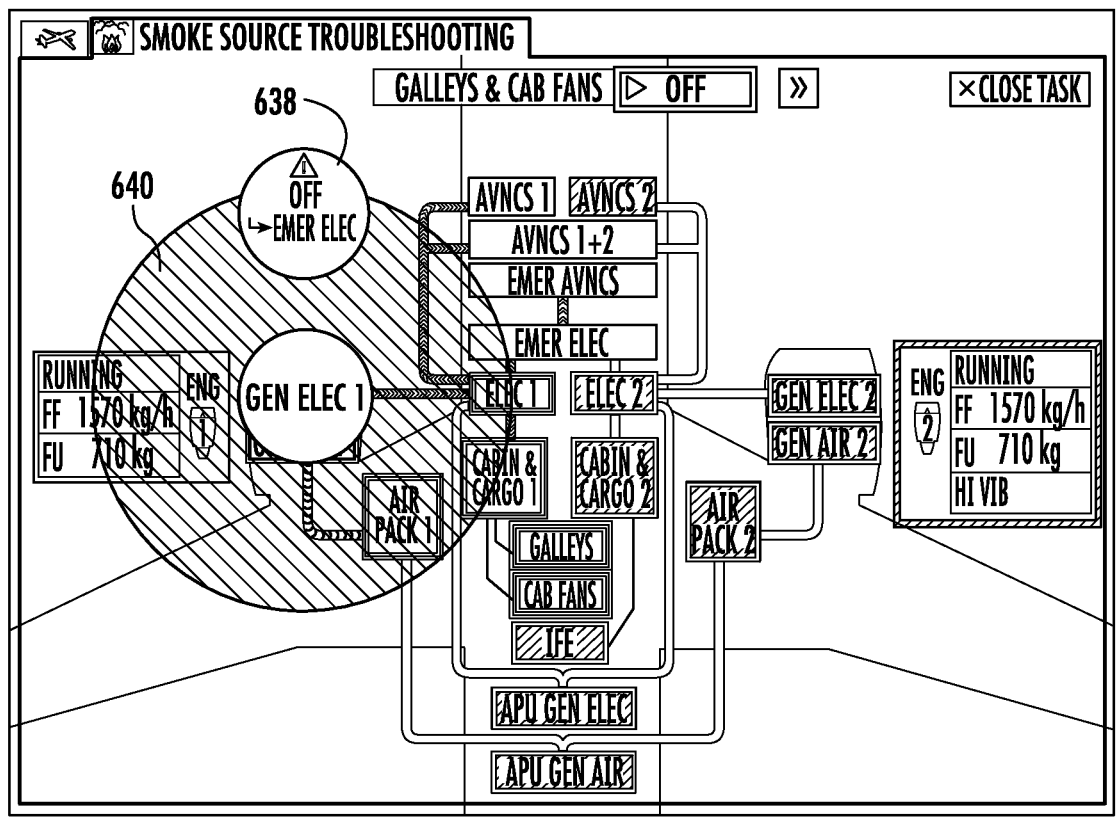

In some aspects, instead of going through a task-specific action sequence such as the smoke troubleshooting sequence, the operator is aware of the possible sources of the smoke and is fully authorized to interact directly with the displayed aircraft systems, and the safeguard mechanism is in place to protect against abnormal and/or dangerous systems commands. For example, as shown in FIG. 6J, the operator decides to directly shut down the GEN ELEC 2 634 and GEN AIR 2 636 systems because engine 2 is showing high vibrations while there is smoke in the cabin. Then when the operator tries to set GEN ELEC 1 614 off, the safeguard mechanism gets activated and places a "zone at risk" 640 over the GEN ELEC 1 614 system icon, wide enough to draw attention from the operator, as illustrated in FIG. 6K. At the same time, the order to deselect the GEN ELEC 1 614 is blocked and potential risk of the action is displayed on a command icon 638. The safeguard mechanism will require the operator to take a specific interaction, such as drag the command icon 638 into the center of zone at risk 640 to confirm the execution of the operator's command.

Figure 6L:
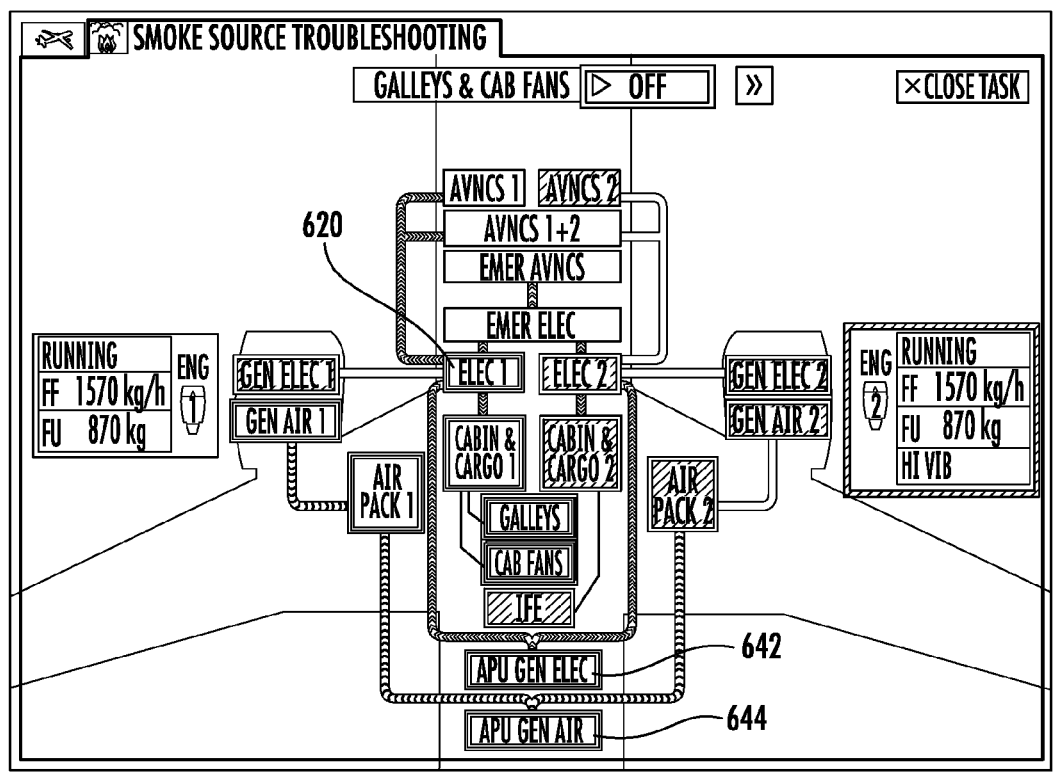

In some aspects, which operator command would set the aircraft in danger is determined dynamically by the safeguard mechanism. For example, as illustrated in FIG. 6L, the APU (APU GEN ELEC 642 and APU GEN AIR 644) is turned on to provide electrical and air flow to the aircraft's systems. As such, when the operator attempts to turn off GEN ELEC 1, the safeguard mechanism will not be activated to block this command, because ELEC 1 620 core is now powered by the APU GEN ELEC 642.

Figure 6M:
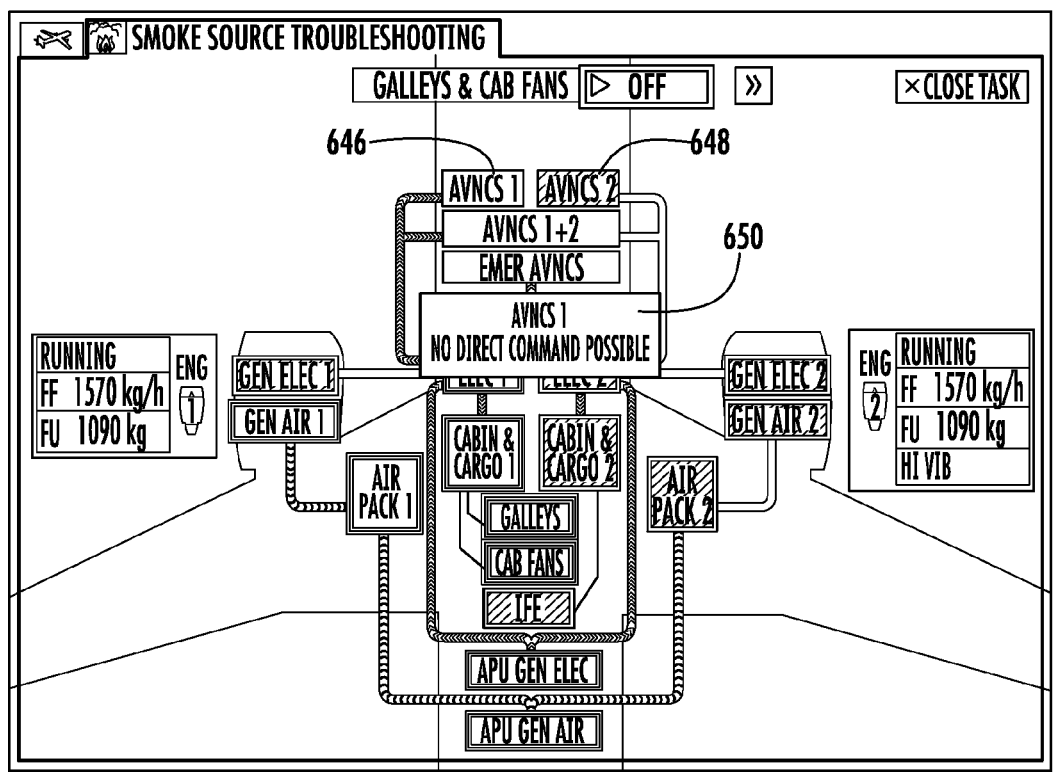

In another aspect, some of the aircraft's systems cannot be directly controlled by an aircraft operator through the TROUBLESHOOTING 600 interface. For example, systems such as AVNCS 1 646 and AVNCS 2 648 cannot be turned off by the operator on this aircraft architecture. When an operator attempts to disable a system such as the AVNCS 1 646 on the TROUBLESHOOTING 600 interface, as illustrated in FIG. 6M, a popup 650 will inform the operator such command cannot be executed. However, an operator can still turn off the AVNCS 1 646 system indirectly, by cutting off its power supply from ELEC 1 620.

In some aspects, an interface system includes graphic objects representing principal elements (e.g. tanks, valves, generators, pumps, etc.) of an aircraft according to their physical locations on the aircraft (e.g. right wing, left wing, cabin, etc.). The systems are connected by various energy flows (e.g. fuel electricity, air, water, etc.) according to the energy flow's direction of circulation as configured in the aircraft. For example, aircraft fuel can be directed from the wing tanks to the engines, and air can be directed by generators to the cabin. Important consumer systems such as fire & smoke systems, or cockpit & avionics systems, are to be displayed either by default and/or by aircraft operator preference, and descriptive information about a system is also displayed. Furthermore, system failures and emergency functions (e.g. fuel imbalance, smoke source troubleshooting, etc.) are also displayed and accessible from the interface.

In some aspects, the graphic objects also inform the aircraft operator as to the state of the associated aircraft system. For example, a system can be shown to be operational or degraded, locked or active, and/or deployment in progress. The graphic object also gives the operator access and control to that system.

Furthermore, multiple interfaces are to be integrated into a centralized platform configured to include several tactile devices. For example, in the event of a system failure, an ABNORMAL MISSION MANAGEMENT interface will pop up automatically or at a pilot's request, to a screen next to the global management interface, or even share the same screen as the management interface.

FIG. 6N is an exemplary illustration of a collection of graphic objects usable by a management interface, in accordance with aspects of the subject matter described herein. The graphic objects can have different contour, color and/or geometric characteristics and are controllable by the management interface. For example, having color in the center of a graphic object makes it possible to show to system being active or inactive (e.g. blue being active, grey being inactive, etc.) Blue is preferably retained because it is a cold color that is known to favor serenity, on the contrary to amber and green that are hotter and are associated with danger. Furthermore, the first contour makes it possible to indicate if a button is actionable or not, and the color of contour makes it possible to indicate the system is operational or degraded. The collection of graphic objects displayed in FIG. 6N can be conveniently changed depending on the airline preference or cockpit configurations, as they are provided and described herein to explain the subject matter and not as a limitation.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for managing a plurality of systems of an aircraft through a dedicated interface, the method comprising:
   at least one global visualization interface implemented using at least one hardware processor:
   displaying at least one or more graphic object representing at least one or more aircraft system, wherein the at least one or more graphic object is displayed on the at least one global visualization interface in reference to a physical location of the at least one or more aircraft system on the aircraft;
   displaying, separately from the at least one or more graphic object representing at least one or more aircraft system, at least one or more insert associated with the at least one aircraft system, wherein the at least one or more insert provides system status information about the at least one aircraft system on the insert, and wherein the system status information comprises contextual and/or supplemental information for providing additional systems information during different phases of a flight;
   displaying at least one or more energy flow icon representing a direction of circulation of an energy flow;
   accessing a system management interface of the at least one or more aircraft system by performing a user interaction with the at least one or more graphic object; and
   initializing a safeguard mechanism configured to prevent the at least one or more aircraft system from executing an inappropriate operating procedure;
   wherein initializing the safeguard mechanism comprises requesting, by the at least one or more aircraft system, a confirmation to take action to prevent the at least one or more aircraft system from executing the inappropriate operating procedure, and displaying the confirmation to take action over the at least one or more graphic object on the at least one global visualization interface.

2. The method of claim 1, wherein displaying at least one or more graphic object representing at least one or more aircraft system includes displaying at least one or more of:
   a graphic object representing at least one or more energy consumer system;
   a graphic object representing at least one or more energy distributor system; and a graphic object representing at least one or more energy supplier system;
wherein each of the energy consumer system, energy distributor system, and the energy supplier system is positioned in a distinct level on the global visualization interface.

3. The method of claim 2, wherein displaying a graphic object representing at least one or more energy distributor system includes displaying at least one or more of:
a graphic object representing an air system of the aircraft;
a graphic object representing an electrical system of the aircraft; and
a graphic object representing a hydraulic system of the aircraft.

4. The method of claim 1, further comprising displaying at least one or more error message about the at least one aircraft system on the insert.

5. The method of claim 1, further comprising accessing a system management interface configured for managing the at least one aircraft system by performing a user interaction with the insert.

6. The method of claim 5, wherein accessing a system management interface includes accessing a task-specific interface configured to diagnose and repair the at least one aircraft system.

7. The method of claim 5, wherein performing a user interaction includes at least one or more of:
tapping the insert on a tactile screen; and
selecting the insert using an interactive device.

8. The method of claim 1, wherein displaying at least one or more energy flow icon includes displaying at least one or more of:
an icon representing flow of fuel;
an icon representing flow of electric flux;
an icon representing flow of hydraulics; and
an icon representing flow of air.

9. The method of claim 1, wherein accessing a system management interface of the at least one aircraft system includes opening a new interface configured for managing the at least one aircraft system.

10. The method of claim 9, wherein opening a new interface includes displaying a graphic icon configured for a return to the global visualization interface.

11. A system for managing a plurality of aircraft systems, the system comprising:
at least one dedicated global visualization interface for managing one or more aircraft systems and comprising a hardware processor, the at least one interface comprising:
at least one or more graphic object representing at least one or more functions realized by the considered system, wherein the at least one or more graphic object is displayed on the at least one global visualization interface in reference to a physical location of the one or more aircraft systems on the aircraft;
at least one or more insert associated with the at least one aircraft system, the one or more insert being displayed separately from the at least one or more graphic object representing at least one or more aircraft system wherein the at least one or more insert provides system status information about the at least one aircraft system on the insert, and wherein the system status information comprises contextual and/or supplemental information for providing additional systems information during different phases of a flight;
at least one or more energy flow icon representing a direction of circulation of an energy flow; and
a safeguard mechanism configured to be initialized in order to prevent the at least one or more aircraft system from executing an inappropriate operating procedure, wherein the safeguard mechanism comprises a confirmation to take action that is configured to be requested, by the at least one or more aircraft system, and displayed over the at least one or more graphic object on the at least one global visualization interface.

12. The system of claim 11, wherein the at least one or more graphic object comprises at least one or more of:
a graphic object representing at least one or more energy consumer system;
a graphic object representing at least one or more energy distributor system; and
a graphic object representing at least one or more energy supplier system.

13. The system of claim 12, wherein the at least one or more energy distributor system comprises at least one or more of:
an aircraft air system;
an aircraft electrical system; and
an aircraft hydraulic system.

14. The system of claim 11, wherein the at least one or more insert is configured to display at least one or more error message about the at least one aircraft system.

15. The system of claim 14, further comprising a task-specific interface configured to diagnose and repair the at least one aircraft system.

16. The system of claim 11, wherein the at least one or more energy flow icon includes at least one or more of:
an icon representing flow of fuel;
an icon representing flow of electric flux;
an icon representing flow of hydraulic; and
an icon representing flow of air.

17. The system of claim 11, further comprising a system management interface configured for managing the at least one aircraft system.

18. A non-transitory computer readable medium having stored thereon executable instructions that when executed by the processor of a computer control the computer to perform steps comprising:
at a global visualization interface for managing a plurality of aircraft systems and in association with a hardware processor:
displaying at least one or more graphic object representing at least one aircraft system, wherein the at least one or more graphic object is displayed on the at least one global visualization interface in reference to a physical location of the at least one aircraft system on the aircraft;
displaying, separately from the at least one or more graphic object representing at least one or more aircraft system, at least one or more insert associated with the at least one aircraft system, wherein the at least one or more insert provides system status information about the at least one aircraft system on the insert, and wherein the system status information comprises contextual and/or supplemental information for providing additional systems information during different phases of a flight;
displaying at least one or more energy flow icon representing a direction of circulation of an energy flow;
accessing a system management interface of the at least one aircraft system by performing an user interaction with the graphic object; and initializing a safeguard mechanism configured to prevent the at least one or more aircraft system from executing an inappropriate operating procedure;

wherein initializing the safeguard mechanism comprises requesting, by the at least one or more aircraft system, a confirmation to take action to prevent the at least one or more aircraft system from executing the inappropriate operating procedure, and displaying the confirmation to take action over the at least one or more graphic object on the at least one global visualization interface.

19. The non-transitory computer readable medium of claim 18, wherein displaying at least one or more graphic object representing at least one or more aircraft system includes displaying at least one or more of:

a graphic object representing at least one or more energy consumer system;

a graphic object representing at least one or more energy distributor system; and a graphic object representing at least one or more energy supplier system;

wherein each of the energy consumer system, energy distributor system, and the energy supplier system is positioned in a distinct level on the global visualization interface.

* * * * *